US010856207B2

(12) United States Patent
Kang

(10) Patent No.: US 10,856,207 B2
(45) Date of Patent: Dec. 1, 2020

(54) WIRELESS MESH NETWORK MANAGEMENT METHOD, DEVICE THEREFOR, AND NON-TRANSITORY COMPUTER-READABLE STORAGE MEDIUM

(71) Applicant: SK PLANET CO., LTD., Seongnam-si (KR)

(72) Inventor: Kichon Kang, Seoul (KR)

(73) Assignee: SK Planet Co., Ltd., Seongnam-si (KR)

( * ) Notice: Subject to any disclaimer, the term of this patent is extended or adjusted under 35 U.S.C. 154(b) by 57 days.

(21) Appl. No.: 16/008,863

(22) Filed: Jun. 14, 2018

(65) Prior Publication Data

US 2018/0295558 A1 Oct. 11, 2018

Related U.S. Application Data

(63) Continuation of application No. PCT/KR2016/007822, filed on Jul. 19, 2016.

(30) Foreign Application Priority Data

Dec. 16, 2015 (KR) .......................... 10-2015-0179924
Dec. 16, 2015 (KR) .......................... 10-2015-0179929

(Continued)

(51) Int. Cl.
*H04W 40/24* (2009.01)
*H04W 52/46* (2009.01)
(Continued)

(52) U.S. Cl.
CPC .......... *H04W 40/244* (2013.01); *H04B 17/17* (2015.01); *H04B 17/309* (2015.01);
(Continued)

(58) Field of Classification Search
CPC ...... H04B 17/17; H04B 17/18; H04B 17/309; H04L 41/0813–0816; H04L 41/142;
(Continued)

(56) References Cited

U.S. PATENT DOCUMENTS 6,385,457 B1 * 5/2002 Dam ..................... H04W 64/00
455/436
8,983,491 B2 * 3/2015 Hiltunen ............... G01S 5/0081
455/456.1

FOREIGN PATENT DOCUMENTS

KR 10-2010-0049918 A 5/2010
KR 10-2012-0059401 A 6/2012
(Continued)

OTHER PUBLICATIONS

International Search Report for corresponding International Application PCT/KR2016/007822, dated Oct. 18, 2016, 4 pages.

*Primary Examiner* — Asad M Nawaz
*Assistant Examiner* — Thomas R Cairns
(74) *Attorney, Agent, or Firm* — Fenwick & West LLP

(57) ABSTRACT

Provided are a wireless mesh network management method for monitoring service traffic between a service device and a user terminal device having recognized a beacon device in its vicinity, detecting an abnormal beacon device or an abnormal wireless AP device that does not operate normally according to a change in the service traffic, and changing a state of the abnormal beacon device or the abnormal wireless AP device, a device for implementing the method, and a computer-readable storage medium on which a computer program for implementing the method is stored.

11 Claims, 14 Drawing Sheets

(30) Foreign Application Priority Data

Dec. 16, 2015 (KR) .................. 10-2015-0179934
Dec. 29, 2015 (KR) .................. 10-2015-0188278

(51) Int. Cl.

| | |
|---|---|
| *H04W 52/32* | (2009.01) |
| *H04B 17/17* | (2015.01) |
| *H04L 12/24* | (2006.01) |
| *H04L 12/26* | (2006.01) |
| *H04B 17/309* | (2015.01) |
| *H04W 24/02* | (2009.01) |
| *H04W 52/18* | (2009.01) |
| *H04W 12/12* | (2009.01) |
| *H04W 24/04* | (2009.01) |
| *H04W 4/80* | (2018.01) |
| *H04W 76/10* | (2018.01) |
| *H04W 76/30* | (2018.01) |

(52) U.S. Cl.
CPC ........ *H04L 41/142* (2013.01); *H04L 43/0876* (2013.01); *H04L 43/0894* (2013.01); *H04W 4/80* (2018.02); *H04W 12/1202* (2019.01); *H04W 12/1208* (2019.01); *H04W 24/02* (2013.01); *H04W 24/04* (2013.01); *H04W 52/18* (2013.01); *H04W 52/325* (2013.01); *H04W 52/46* (2013.01); *H04W 76/10* (2018.02); *H04L 41/0816* (2013.01); *H04L 43/16* (2013.01); *H04W 76/30* (2018.02)

(58) Field of Classification Search
CPC ..... H04L 43/0876–0894; H04L 43/16; H04W 4/80; H04W 12/12; H04W 24/00–04; H04W 24/08; H04W 40/244; H04W 52/18; H04W 52/22; H04W 52/38; H04W 52/325; H04W 52/46; H04W 76/10; H04W 76/30; H04W 88/06; H04W 88/10; H04W 88/12

See application file for complete search history.

(56) References Cited

FOREIGN PATENT DOCUMENTS

| | | |
|---|---|---|
| KR | 10-2013-0037089 A | 4/2013 |
| KR | 10-1488610 B1 | 1/2015 |
| KR | 10-2015-0106756 A | 9/2015 |
| WO | WO 2017/104925 A1 | 6/2017 |

\* cited by examiner

WIRELESS MESH NETWORK MANAGEMENT METHOD, DEVICE THEREFOR, AND NON-TRANSITORY COMPUTER-READABLE STORAGE MEDIUM

CROSS-REFERENCE TO RELATED APPLICATION

The present application is a continuation of International Patent Application No. PCT/KR2016/007822, filed on Jul. 19, 2016, which is based upon and claims priorities to Korean Patent Application No. 10-2015-0179924, filed on Dec. 16, 2015, Korean Patent Application No. 10-2015-0179929, filed on Dec. 16, 2015, Korean Patent Application No. 10-2015-0179934, filed on Dec. 16, 2015, and Korean Patent Application No. 10-2015-0188278, filed on Dec. 29, 2015. The disclosures of the above-listed applications are hereby incorporated by reference herein in their entirety.

BACKGROUND

1. Technical Field

The present disclosure relates to a method of managing a wireless network between a plurality of beacon devices constituting a mesh network, a device therefor, and a non-transitory computer-readable storage medium having stored thereon a computer program for implementing the method. More particularly, the present disclosure relates to a method and device for monitoring service traffic between a service device and a user terminal device having recognized a beacon device in its vicinity, and detecting an abnormal beacon device that does not operate normally or needs a setting change according to a change in the service traffic, to increase a coverage of another beacon device in the vicinity of the abnormal beacon device, to perform remote checking of the abnormal beacon device through an administrator terminal device, or to perform the setting change through the user terminal device. Also, the present disclosure relates to a method and device for checking connection state between a beacon device and a wireless AP device, and increasing a coverage of the beacon device to change the connection state when the connection state is determined to be abnormal. Further, the present disclosure relates to a wireless mesh network management method for taking measures when an abnormality occurs in the beacon device or the wireless AP device, a device for implementing the method, and a computer-readable storage medium on which a computer program for implementing the method is stored.

2. Description of the Related Art

The description in this section provides background information of embodiments of the present disclosure and is not intended to specify prior arts of the present disclosure.

A wireless network generally has star topologies such as point-to-point and point-to-multipoint topologies. Recently, however, there is a growing interest in a wireless network having a mesh structure of multipoint-to-multipoint topology.

The wireless mesh network allows easy expansion of the network without increasing connections to a wired network and has advantages in a flexibility and scalability of the network because it facilitates quick and economical installation of the network and provides redundancy owing to a capability of multi-path routing of traffic.

In a conventional network environment, an access network is configured based on access point (AP) devices such as a repeater or a wireless router, and all the connections of the AP devices in the access network and to a core network are implemented by wired communication links.

In a wireless mesh network, however, only a representative AP device is connected to the wired network, and wireless routers that serve the role of antennas like the conventional base stations may become mesh nodes and connect all devices in wireless links. The wireless mesh network allows to implement a network structure similar to a wired mesh network in a wireless network, and makes it possible to overcome the limitation of the wireless LAN.

Meanwhile, with the development of the mobile communications network and the upgrading of the terminal specification, a mobile communication terminal has become a necessity of the modern people beyond the scope of a simple communication device or information providing device and is evolving to a total entertainment device.

Also, technologies for performing short-range wireless communications between mobile communication terminal devices located in close proximity are rapidly developing. Bluetooth is one of such short-range wireless communication schemes.

The Bluetooth communication has evolved steadily and, recently, Bluetooth low energy (BLE) technology or Bluetooth 4.0 which consume less power than standard Bluetooth technology has been widely used in smartphones, retail geofencing, and mobile payments.

A service scheme for providing various information to the mobile terminal of the user based on beacon devices using the Bluetooth has been developed, and mesh networks constructed based on the beacon devices using the Bluetooth are increasing.

Such wireless mesh networks, however, have drawbacks that, when a beacon device is not operable due to a failure or hacking, all other beacon devices including the devices connected in a lower layer may become inoperable.

As a result, a method of effectively changing, checking, and maintaining connections between the beacon devices is necessary when a beacon device is abnormal in the wireless mesh network constructed based on the beacon devices.

SUMMARY

Provided are methods and devices for accurately and quickly detecting an abnormal beacon device that is inoperable due to a failure or hacking in a wireless mesh network to solve the above problem, and a computer-readable storage medium on which a computer program for implementing the methods is stored.

More specifically, provided are a wireless mesh network management method for monitoring service traffic between a service device and a user terminal device having recognized a beacon device in its vicinity, detecting an abnormal beacon device that does not operate normally according to a change in the service traffic, and increasing a coverage of another beacon device in the vicinity of the abnormal beacon device to change a connection state, a device for implementing the method, and a computer-readable storage medium on which a computer program for implementing the method.

Also, provided are a wireless mesh network management method for monitoring service traffic between a service device and a user terminal device having recognized a beacon device in its vicinity, detecting an abnormal beacon device that does not operate normally according to a change in the service traffic, choosing an administrator terminal device for remotely checking of the abnormal beacon device, connecting the abnormal beacon device to the service device through the administrator terminal device, and performing remote checking of the abnormal beacon device through the administrator terminal device, a device for implementing the method, and a computer-readable storage medium on which a computer program for implementing the method.

Also, provided are a wireless mesh network management method for monitoring service traffic between a service device and a user terminal device having recognized a beacon device in its vicinity, detecting a beacon device that needs a setting change according to a change in the service traffic, searching a user terminal device for use in the setting change, connecting the beacon device to the service device through the user terminal device, and performing the setting change through the user terminal device, a device for implementing the method, and a computer-readable storage medium on which a computer program for implementing the method.

Provided are a wireless mesh network management method that a beacon device receives a state check message from a wireless AP device, determines that the wireless AP device is abnormal if the state check message is not received from the wireless AP device for a predetermined period of time, and, if the wireless AP device is determined to be abnormal, increases a transmission power to enlarge a coverage so that another beacon device having been connected to the abnormal the wireless AP device establishes a connection to another wireless AP device or the other beacon device in an enlarged coverage, a device for implementing the method, and a computer-readable storage medium on which a computer program for implementing the method.

It is to be understood that the technical problems to be solved by the present disclosure are not limited to the above-mentioned problems and other technical problems having not mentioned above will be apparent to those skilled in the art from the following description.

According to a first exemplary embodiment, the wireless mesh network management uses the service device. The method includes operations of: monitoring service traffic generated correspondingly to one or more beacon devices for each beacon device; determining whether each of the beacon devices is abnormal according to a change in the service traffic; when there is an abnormal beacon device, increasing transmission power of one or more beacon devices located within a certain range from an abnormal beacon device so that coverage of the beacon devices of which transmission power is increased is enlarged; and controlling the beacon device having been connected to the abnormal beacon device to be connected to the beacon device of which coverage is enlarged.

The method may further include an operation of: collecting a statistic value of the service traffic in a normal state for each of the at least one beacon device. The operation of determining whether each of the beacon devices is abnormal may be performed by comparing a current service traffic volume for each beacon device with the statistic value of the service traffic volume for each beacon device in the normal state, and checking the change of the service traffic volume.

In the operation of determining whether each of the beacon devices is abnormal, the beacon device may be determined to be abnormal when a difference between a current service traffic volume for each beacon device and the statistic value of the service traffic volume for each beacon device is greater than a first threshold value.

In the operation of determining whether each of the beacon devices is abnormal, the beacon device may be determined to be abnormal when a current service traffic volume for each beacon device is less than a second threshold value.

In the operation of increasing the transmission power, the beacon device of which coverage is to be enlarged may be chosen by using network management information previously stored in the service device.

According to a second exemplary embodiment, the wireless mesh network management uses the service device. The method includes operations of: monitoring service traffic generated correspondingly to one or more beacon devices for each beacon device; determining whether each of the beacon devices is abnormal according to a change in the service traffic; when there is an abnormal beacon device, choosing an administrator terminal device for checking an abnormal beacon; and transmitting information about the abnormal beacon device to the administrator terminal device.

In the operation of choosing an administrator terminal device, an administrator terminal device located within a certain range from the abnormal beacon device may be chosen for the administrator terminal device for checking the abnormal beacon.

In the operation of choosing an administrator terminal device, the administrator terminal device for checking the abnormal beacon may be chosen based on administrator information previously stored in the service device.

The method may further include operations of: connecting the beacon device to the abnormal beacon device through the administrator terminal device; and performing a remote checking the abnormal beacon device.

The remote checking may be carried out to detect whether an external intrusion has occurred to the abnormal beacon device.

The method may further include an operation of: collecting a statistic value of the service traffic in a normal state for each of the at least one beacon device. The operation of determining whether each of the beacon devices is abnormal may be performed by comparing a current service traffic volume for each beacon device with the statistic value of the service traffic volume for each beacon device in the normal state, and checking the change of the service traffic volume.

In the operation of determining whether each of the beacon devices is abnormal, the beacon device may be determined to be abnormal when a difference between a current service traffic volume for each beacon device and the statistic value of the service traffic volume for each beacon device is greater than a first threshold value.

In the operation of determining whether each of the beacon devices is abnormal, the beacon device may be determined to be abnormal when a current service traffic volume for each beacon device is less than a second threshold value.

According to a third exemplary embodiment, the wireless mesh network management uses the service device. The method includes operations of: monitoring service traffic generated correspondingly to one or more beacon devices for each beacon device; determining whether each of the beacon devices requires a setting change according to a change in the service traffic; searching a user terminal device within a certain range from the beacon device which is determined to require the setting change; controlling a user terminal device found during the searching operation to establish a connection to the beacon device which is determined to require the setting change; and communicating with the beacon device through the user terminal device to control to change settings of the beacon device.

The method may further include an operation of: collecting a statistic value of the service traffic in a normal state for each of the at least one beacon device. The operation of determining whether each of the beacon devices requires the setting change may be performed by comparing a current service traffic volume for each beacon device with the statistic value of the service traffic volume for each beacon device in the normal state, and determining the beacon device to be abnormal when a difference between a current service traffic volume for each beacon device and the statistic value of the service traffic volume for each beacon device is less than a first threshold value but is greater than a second threshold value.

The method may further include an operation of: setting a target service traffic volume. The service device may compare a current service traffic volume for each beacon device with the target service traffic volume for each beacon device, and determine that the beacon device requires the setting change when a difference between a current service traffic volume for each beacon device and the target service traffic volume is greater than a third threshold value.

The operations of controlling the user terminal device and communicating with the beacon device to control to change settings may be performed in a background of the user terminal device.

The operation of communicating with the beacon device to control to change settings may be performed by increasing transmission power of the beacon device determined to require the setting change to enlarge a coverage of the beacon device determined to require the setting change.

The operation of communicating with the beacon device to control to change settings may be performed by controlling the beacon device determined to require the setting change to change a channel.

The operation of communicating with the beacon device to control to change settings may include operations of: checking the beacon device determined to require the setting change can be connected to a wireless AP device; checking whether the beacon device determined to require the setting change is connected to another beacon device or a wireless AP device; if the beacon device determined to require the setting change is connected to the other beacon device, control the beacon device determined to require the setting change to release a connection from the other beacon device and establish a new connection to a wireless AP device.

The operation of communicating with the beacon device to control to change settings may include operations of: checking whether the beacon device determined to require the setting change is connected to another beacon device or a wireless AP device; and if the beacon device determined to require the setting change is connected to another beacon device, control the beacon device determined to require the setting change to release a connection from the another beacon device and establish a new connection to the other beacon device other than the another beacon device.

According to a fourth exemplary embodiment, the wireless mesh network management is performed by a beacon device. The method includes operations of: periodically receiving a state check message from a wireless AP device; determining that whether the wireless AP device is abnormal if the state check message is not received from the wireless AP device for a predetermined period of time; if the wireless AP device is determined to be abnormal, increasing transmission power of the beacon device to enlarge coverage; and searching for another wireless AP device in an enlarged coverage and establishing a connection to the other wireless AP device or the other beacon device.

In the operation of increasing the transmission power, the transmission power may be may be specified stepwise within a predetermined range and increased stepwise.

In the operation of searching for the other wireless AP device coverage and establishing the connection, the other wireless AP device is searched for each step of the transmission power.

In the operation of searching for the other wireless AP device coverage and establishing the connection, another beacon device is searched when the other wireless AP device is not found, and the beacon device is controlled to establish a connection to the other beacon device.

In the operation of searching for the other wireless AP device coverage and establishing the connection, only another beacon device in a lower lay is controlled to be connected.

In the operation of searching for the other wireless AP device coverage and establishing the connection, when there are a plurality of the other beacon devices, the beacon devices in a lower layer are controlled to be connected to separately different beacon devices.

According to a second exemplary embodiment, a service device includes: a communication module configured to exchange data with at least one beacon device or mobile communications terminal device; and a controller configured to monitor, for each of the at least one beacon device, service traffic generated correspondingly to the at least one beacon device, and determine whether any of the at least one beacon device is abnormal or requires change of setting according to a change in the service traffic. When it is determined that there is an abnormal beacon device, the controller chooses an administrator terminal device for checking the abnormal beacon device, and transmits information of the abnormal beacon device to a chosen administrator terminal device.

According to a first exemplary embodiment, a service device includes: a communication module configured to exchange data with at least one beacon device or mobile communications terminal device; and a controller configured to monitor, for each of the at least one beacon device, service traffic generated correspondingly to the at least one beacon device, and determine whether any of the at least one beacon device is abnormal or not according to a change in the service traffic. When it is determined that there is an abnormal beacon device, the controller controls one or more beacon device located within a predetermined range from the abnormal beacon device to increase a transmission power to enlarge a coverage, and controls one or more beacon device connected to the abnormal beacon device to release the connection to the abnormal beacon device and establish a new connection to the beacon device of which coverage is enlarged.

According to a second exemplary embodiment, a service device includes: a communication module configured to exchange data with at least one beacon device or mobile communications terminal device and transmit a control message to a user terminal device; and a controller configured to monitor, for each of the at least one beacon device, service traffic generated correspondingly to the at least one beacon device, and determine whether any of the at least one beacon device is abnormal or requires change of setting according to a change in the service traffic. When it is determined that there is a beacon device that requires the change of setting, the controller searches for a user terminal device located within a predetermined range from the beacon device that requires the change of setting, connects a found user terminal device to the beacon device that requires the change of setting, and controls the found user terminal device to communicate with the beacon device that requires the change of setting and to change a setting of the beacon device that requires the change of setting.

According to a third exemplary embodiment, a beacon device includes: a first communication unit configured to communicate with a wireless AP device or another beacon device; a second communication unit configured to communicate with another beacon device; and a controller configured to periodically receive a state check message from the wireless AP device, and determines that an abnormality occurred in the wireless AP device when the state check message is not received for a predetermined period of time, wherein, when it is determined that the abnormality occurred in the wireless AP device, the controller increases transmission power to enlarge a coverage, searches for another wireless AP device in an enlarged coverage, and establishes a connection to another wireless AP device after the other wireless AP device is found.

Further, the present disclosure may provide a computer-readable storage medium on which a computer program for implementing the method is stored.

According to the wireless mesh network management method of the present disclosure, the service traffic for each beacon device is monitored and the abnormal state of the beacon device is determined according to the change of the service traffic volume. Thus, it is possible to detect an abnormal beacon device accurately and quickly.

According to the present disclosure, for recovering proper operation of another beacon device that has been connected to an abnormal beacon device, the transmission power of a beacon device located in the vicinity of the abnormal beacon device may be increased, so that the coverage of the beacon device located in the vicinity of the abnormal beacon device is enlarged and the connection of the beacon device that has been connected to the abnormal beacon device is changed. Thus, the beacon device that has been connected to the abnormal beacon device may operate properly.

According to the present disclosure, for checking an abnormal beacon device, an administrator terminal device for connecting the service device and the abnormal beacon device may be chosen, so that the service device may directly perform the remote checking of the abnormal beacon device. Thus, the service device may quickly perform the remote check of the abnormal beacon device, thereby quickly responding to an abnormality of the beacon device.

According to the present disclosure, for facilitating the change of a setting of the beacon device, a user terminal device for connecting the service device and the beacon device of which setting is to be changed, so that the service device may directly perform the setting change of the beacon device. Thus, the service device may quickly perform the setting change of the beacon device, thereby quickly responding to an abnormality of the beacon device or to a change in the network environment.

According to the present disclosure, for checking an abnormal beacon device, for recovering proper operation of a beacon device that has been connected to an abnormal wireless AP device, the transmission power of a beacon device that has been connected to an abnormal wireless AP device may be increased, so that the coverage of the beacon device having been connected to the abnormal wireless AP device is enlarged and the connection of the beacon device having been connected to the abnormal wireless AP device is changed. Thus, the beacon device having been connected to the abnormal wireless AP device may operate properly.

Therefore, a wireless network having the characteristics of the flexibility and scalability may be constructed quickly and economically with no concern about a contamination of the beacon device. The wireless mesh network similar to a wired mesh network may be implemented in the wireless network, and it is possible to overcome the limitation of the wireless LAN.

The advantageous effects of the present disclosure are not limited to the effects mentioned above, but other effects having not mentioned will be apparent to those skilled in the art from the following description.

DETAILED DESCRIPTION

Figure 1:
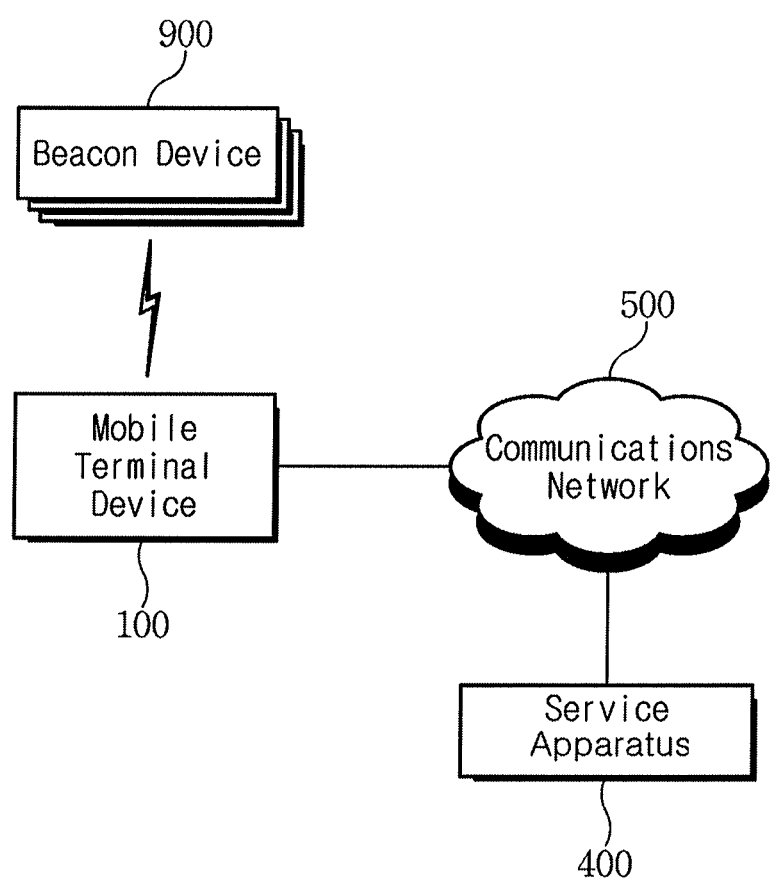
FIG. 1 is a schematic block diagram of a system for performing a wireless mesh network management method according to an embodiment of the present disclosure.

For a more clear understanding of the features and advantages of the present disclosure, the present disclosure will be described in detail with reference to the accompanied drawings.

In the following description and the accompanied drawings, detailed descriptions of well-known functions or configuration that may obscure the subject matter of the present disclosure will be omitted for simplicity. It is to be noted that the same components are designated by the same reference numerals throughout the drawings.

The terms and words used in the following description and drawings are not necessarily to be construed in an ordinary sense or a dictionary, and may be appropriately defined herein to be used as terms for describing the present disclosure in the best way possible. Such terms and words should be construed as meaning and concept consistent with the technical idea of the present disclosure.

The configurations of embodiments described in this specification or shown in the drawings are merely the most preferred embodiments of the present disclosure, and do not limit the technical ideas of the present disclosure. Therefore, it should be understood that there are various equivalents and modifications that may replace the configurations of the embodiments.

The terminologies including ordinals such as "first" and "second" used to explain various elements in this specification may be used to discriminate an element from the other ones or for simplicity. For example, a second component may be referred to as a first component, and similarly, a first component may also be referred to as a second component without departing from the scope of the present disclosure.

When an element is referred to as being "connected" or "coupled" to another element, it means that it is logically or physically connected or it may be connected to the other element. In other words, it is to be understood that although an element may be directly connected or coupled to another element, there may be other elements therebetween, or element may be indirectly connected or coupled to the other element.

The terminology used herein is for the purpose of describing particular embodiments only and is not intended to be limiting of the disclosure. The singular forms include plural referents unless the context clearly dictates otherwise.

Also, The expressions "~comprises," "~includes," "~constructed," "~configured" are not to be construed as being equipped with all the components, processing steps, or operations described in this specification, but some of the components, the processing steps, or the operations may not be included and additional elements may be incorporated further.

Terminologies such as "~unit" and "~module" refer to entities performing at least one function or operation, and may be implemented by hardware, software, or combination thereof.

The articles 'a,' 'an,' 'the,' 'one,' and their equivalents may be used in the sense of including both the singular and the plural meaning unless the context clearly indicates otherwise or is clearly contradicted by context in the context of describing the disclosure, particularly, in the context of the following claims.

The service of determining entry/exit of the terminal device in a shop (hereinbelow, referred to as 'shop entry/exit') will be described in terms of Bluetooth low energy (BLE) data communication technology.

While the NFC is operable only when the devices are located within a few tens of centimeters, the Bluetooth system is operable even when the devices are spaced apart by a distance of several tens of meters, and thus application thereof is getting wider and wider. In particular, The Bluetooth allows data transfer between the devices without tagging or bringing a device closer to another device such as a reader unlike the NFC. Further, the Bluetooth enables to transfer customized data even when the devices are moving in a building.

Nevertheless, however, the present disclosure does not require the Bluetooth or Bluetooth Low Energy (BLE) as a prerequisite, and other local communications schemes of Personal Area Network (PAN) technology such as Zigbee, Ultra-WideBand (UWB), ANT, and Wi-Fi may be applicable.

Now, a wireless mesh network management method according to an embodiment of the present disclosure and a computer readable recording medium on which a program for executing the method are recorded will be described in detail with reference to the drawings.

First, a wireless mesh network management system according to an embodiment of the present disclosure will be described.

The terms "abnormality" and "abnormal state" of a beacon device are used herein to refer to a state of the beacon device that the beacon device is not operable normally due to a failure of the beacon device, or the beacon device is contaminated by an unauthorized external access such as hacking, so that information is maliciously falsified and the falsified information is transmitted to the user.

Also, the terms "abnormality" and "abnormal state" when used for a wireless AP device refers to a state of the wireless AP device that the wireless AP device is not operable normally due to a failure of the wireless AP device, or the wireless AP device is contaminated by an unauthorized external access such as hacking, so that information is maliciously falsified and the falsified information is transmitted to the user.

FIG. 1 is a schematic block diagram of a system for performing a wireless mesh network management method according to an embodiment of the present disclosure.

The wireless mesh network management system according to an embodiment of the present disclosure includes a mobile communications terminal device (hereinbelow, referred to as 'mobile terminal device') 100, a beacon device 900, a service device 400, and a communications network 500 connecting the mobile terminal device 100 and the service device 400.

The system may be installed in a place having a certain area to any extent determined by the administrator's decision. For example, the system may be installed in the entire area or on some floors of a department store or a warehouse store. Alternatively, the system may be installed in a certain area with a large number of building.

The beacon device 900 transmits and receives a beacon signal over a short-range wireless communication scheme such as BLE or Wi-Fi, so that the mobile terminal device 100 in the vicinity receives the beacon signal. The mobile terminal device 100 receiving the beacon signal transmits information included in the beacon signal such as a universally unique identifier (UUID) and a received signal strength to the service device 400 through the communications network 500. The service device 400 stores service information such as a coupon, discount information, and advertisement information for each beacon device 900 and transmits the service information of the beacon device 900 corresponding to information received from the mobile terminal device 100 to a user terminal, so that the mobile terminal device 100 outputs the service information to a user.

In the process that the mobile terminal device 100 receives the information included in the beacon signal from the beacon device 900, transmits the information to the service device 400, and receives relevant contents, service traffic corresponding to the beacon device 900 may be generated between the mobile terminal device 100 and the service device 400.

The mobile terminal device 100 refers to a device of a network user or an administrator that is capable of transmitting and receiving various data through a wireless communications network provided by the present disclosure. The user refers to a person who receives a customer service such as the coupon, the discount information, and the advertisement provision provided by a wireless mesh network of the present disclosure. The administrator refers to a person who maintains the service device 400 for providing the customer service or a particular beacon device 900.

Here, the term "mobile terminal device" may be replaced by another terms such as a user equipment (UE), mobile station (MS), mobile subscriber station (SS), subscriber station (SS), advanced mobile station (AMS), wireless terminal (WT), machine-type communication (MTC) device, machine-to-machine (M2M) device, device-to-device (D2D) device, and station (STA). However, the present disclosure is not limited thereto, and any device capable of being connected to the wireless communications network of the present disclosure may correspond to the mobile terminal device 100 described herein. Any unit equivalent to the device units listed above may be used as the mobile terminal device 100 as well. The mobile terminal device 100 may perform voice or data communications through the wireless communications network of the present disclosure, and may include a browser for transmitting and receiving information, a memory for storing programs and protocols, and a microprocessor for executing programs for calculation and control purposes.

In addition, the mobile terminal device 100 according to embodiments of the present disclosure may be implemented in various forms. For example, a mobile terminal equipped with a wireless communications protocol stack, e.g. a smartphone, a tablet PC, a personal digital assistant (PDA), a portable multimedia player (PMP) may be used for the mobile terminal device 100 described herein.

In particular, the mobile terminal device 100 according to an embodiment of the present disclosure is capable of Bluetooth communication, for example, Bluetooth 4.0, i.e., Bluetooth low energy (BLE), and Wi-Fi connection. The mobile terminal device 100 may receive the beacon signal transmitted by the beacon device 900 through BLE communication and receive a Wi-Fi based beacon, thereby performing a predetermined processing. Besides, the mobile terminal device 100 may perform another predetermined processing through Wi-Fi communication or other bidirectional communication with the wireless AP devices.

Among a plurality of the mobile terminal devices 100, a device using the service provided by the administrator of the service device 400 is referred to as a user terminal device, and another device used by the administrator who operates the network and provides the service is referred to as an administrator terminal device.

The detailed configuration of the mobile terminal device 100, the user terminal device, and the administrator terminal device will be described below.

Each beacon device 900 is installed at a predetermined position for a common beacon service and periodically transmits a beacon signal. The beacon signal may include beacon identification information such as unique identification information or location information assigned to the beacon device 900. The beacon identification information may be a reference that the mobile terminal device 100 receives the beacon service.

Specifically, if the mobile terminal device 100 located in a communication coverage of the beacon device 900 receives the beacon signal transmitted by the beacon device 900, the mobile terminal device 100 transmits a service request including the beacon identification information extracted from the beacon signal to the service device 400, which provides the mobile terminal device 100 with service information (e.g., a service page) corresponding to the beacon identification information.

The beacon identification information used in the beacon service, in case of the BLE beacon, may be unique information of the BLE beacon including the universally unique identifier (UUID), a Major value, a Minor value, and the received signal strength.

The beacon identification information of the BLE beacon typically includes a 16-byte UUID, a 2-byte Major value, and a 2-byte Minor value. The UUID is a standard identifier of 32 hexadecimal digits indicating manufacturer, application, or owner of the beacon, and is standardized by the Open Software Foundation (OSF) as a part of Distributed Computing Environment (DCE).

In the case of a Wi-Fi beacon, the identification information may be unique values of each Wi-Fi device including a Basic Service Set Identifier (BSSID), frequency, and received signal strength. The BSSID is a 48-bit Basic Service Set (BSS) identifier specified in IEEE 802.11, a wireless local area network (WLAN) standard, and may be used as a network identifier. The BSSID typically is a media access control (MAC) address of an access point (AP) device, but is generated as an arbitrary value in the case of an independent BSS or an ad hoc network.

Although BLE and Wi-Fi were described for examples, the present disclosure is not limited thereto and another wireless communication scheme may be used in the beacon device 900 as mentioned above.

More detailed description of the beacon device 900 according to an embodiment of the present disclosure will be provided below.

The service device 400, which provides a service to the user through the communications network 500, receives a service request packet from the mobile terminal device 100 and transmits a response packet to the mobile terminal device 100 having transmitted the service request packet. Also, the service device 400 may control the beacon device 900 through the communications network 500.

The service device 400 may be a known Web server on Internet, that is well known in the art, that may be implemented by using a web application server (WAS), an Internet Information Server (IIS), Apache Tomcat or Nginx. Another device that may be used to configure a network computing environment may be used as the service device 400. The service device 400 supports an operating system (OS) such as Linux or Windows and can execute a received control command. In software, the service device 400 may include program modules or objects implemented by using a programming language such as C, C++, Java, Visual Basic, Visual C, or the like.

In particular, the service device 400 according to an embodiment of the present disclosure may control the beacon device 900 and measure a service traffic volume of each beacon device 900 through the beacon device 900 or the mobile terminal device 100. Also, the service device 400 may determine an abnormal condition of the beacon device 900 or necessity for changing setting of the beacon device 900 by monitoring a change of the service traffic volume.

The service device 400 monitors the service traffic volume, for each beacon device, transmitted according to the request of the user terminal 100 having recognized the beacon device in its vicinity, and collects statistic values of the service traffic volume for each beacon device in a normal state.

The service device 400 compares the service traffic volume detected currently for each beacon device with the statistic values of the service traffic volume for each beacon device in a normal state, and checks the change of the service traffic volume to determine whether there is an abnormality in each of the beacon devices according to the change of the service traffic volume.

Here, there are two methods that the service device 400 determines whether the beacon device 900 is abnormal or not.

First, the service device 400 may compare the current service traffic volume with a statistic value of the service traffic volume in the normal state and determine a corresponding beacon device to be abnormal when a difference between the current service traffic volume and the statistic value of the service traffic volume in the normal state is greater than a first threshold value. That is, the service device 400 may continually compare the service traffic volume for each beacon device with the statistic value of the service traffic volume in the normal state, and determine that the corresponding beacon device is abnormal when the service traffic decreases sharply.

Second, the service device 400 may determine that the corresponding beacon device is abnormal when the current service traffic volume is less than a second threshold value.

In addition, the service device 400 may determine which administrator terminal device is close to the beacon device 900 by using the beacon identification information, and may choose a administrator terminal device for checking the beacon device 900 and transmit information of an abnormal beacon device 900 to a chosen administrator terminal device.

Also, the service device 400 may determine which user terminal device is close to the beacon device 900 by using the beacon identification information, and may perform searching for a user terminal device for connecting to the beacon device 900 and transmit information of a beacon device of which setting are to be changed.

More detailed description of the service device 400 according to an embodiment of the present disclosure will be provided below.

The communications network 500 which allows the connection of the service device 400 to the mobile terminal device 100 is a network, e.g. Internet, an intranet, a mobile communications network, and a satellite network, that facilitates data exchange between the devices by using an Internet protocol. The communications network 500 is coupled with various devices including the service device 400 and the mobile terminal device 100 to provide computing resources such as hardware and software. Thus, the communications network 500 may be collective term including closed networks such as a local area network (LAN) and a wide area network (WAN), open networks such as Internet, mobile networks such as a Code Division Multiple Access (CDMA) network, a Wideband Code Division Multiple Access (WCDMA) network, a Global System for Mobile Communications (GSM) network, a Long Term Evolution (LTE) network, and an Evolved Packet Core (EPC) network, and next generation networks and computing networks to be implemented in the future.

Also, the communications network 500 includes a plurality of access networks (not shown) and a core network (not shown), and may further include an external network such as Internet (not shown). The access network (not shown), which allows the mobile terminal device 100 and the beacon device 900 to connected to the core network, may include a plurality of base stations such as a traditional base station (BS), a base transceiver station (BTS), a Node B (or NodeB), an Evolved Node B (eNodeB), and a plurality of base stations such as a traditional Base Station Controller (BSC) or a Radio Network Controller (RNC). Meanwhile, a digital signal processing unit and a radio signal processing unit integrally implemented in the base station may be divided into a digital unit (as DU) and a radio unit (RU), so that each of a plurality of RUs are provided in respective one of a plurality of areas, and the plurality of RUs) are connected to a centralized DU.

A core network constituting a mobile network together with the access network connects the access network to an external network, for example, Internet.

The core network, which performs main functions for mobile communication services such as mobility control and switching among the access networks, performs circuit switching or packet switching operations and manages and controls packet flow in the communications network 500. Also, the core network allows inter-frequency mobility and may play a role for interworking traffics in the access network and the core network with another network such as Internet. The core network may further include at least one of: a Serving Gateway (SGW), a Packet Data Network (PDN) Gateway, a Mobile Switching Center (MSC), a Home Location Register (HLR), a Mobile Management (MME), and a Home Subscriber Server (HSS).

Internet (not shown), which refers to a public network that allows information exchange according to a TCP/IP protocol, is connected to the service device 400 and may provide information provided by the service device 400 to the mobile terminal device 100 via the core network and the access network while providing service request information provided by the mobile terminal device 100 to the service device 400 via the core network and the access network. Further, Internet allows the connection between the service device 400 and the mobile terminal device 100 to facilitate providing of services utilizing the beacon device 900.

A processor mounted in each device according to an embodiment of the present disclosure may execute program instructions for performing the method according to the present disclosure. The processor may be a single-threaded processor. Alternatively, however, the processor may be a multithreaded processor. The program instructions executed by the processor may be stored on a memory or storage device.

The overall system for performing the wireless mesh network management method according to an embodiment of the present disclosure has been described above.

Next, described is a mesh network around the beacon device 900 in the overall system performing the wireless mesh network management method according to an embodiment of the present disclosure.

Figure 2:
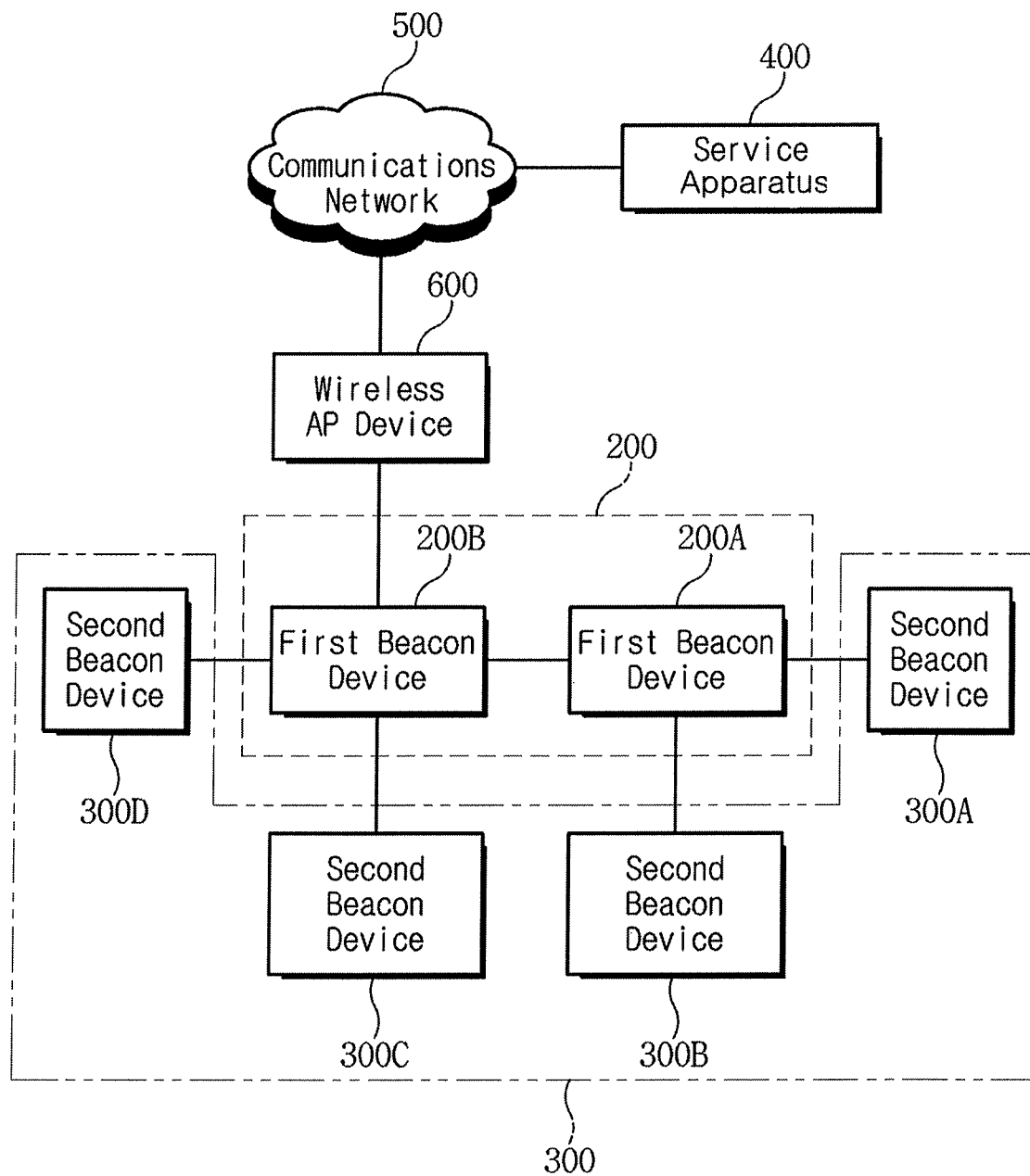
FIG. 2 is a schematic block diagram of a mesh network for applying the wireless mesh network management method according to an embodiment of the present disclosure.

FIG. 2 is a schematic block diagram of a mesh network for applying the wireless mesh network management method according to an embodiment of the present disclosure.

Referring to FIG. 2, the mesh network according to an embodiment of the present disclosure include the communications network 500, a wireless access point (AP) device 600, connected to the communications network 500, a first beacon device 200 that may be connected to the wireless AP device 600, and a second beacon device 300 connected to the first beacon device 200.

The communications network 500 is a network, e.g. Internet, the intranet, the mobile communications network, and a satellite network, that facilitates data exchange between devices by using an Internet protocol as described above with reference to FIG. 1. While the communications network 500 shown in FIG. 1 allows the connection between the service device 400 and the mobile terminal device 100 to provides a channel through which the service device 400 provides services to the user and the administrator manages the network, the communications network 500 shown in FIG. 2 allows the connection between the service device 400 and the wireless AP device 600 to provides a channel through which the service device 400 may control one or more beacon devices 900.

Each of the first beacon device 200 and the second beacon device 300 is a kind of the beacon device 900. There may be a plurality of first beacon devices 200 and the second beacon devices 300. The difference between the first beacon device 200 and the second beacon device 300 will be described below.

The second beacon device 300 is under the management of the first beacon device 200. The first beacon device 200 is connected to the wireless AP device 600 for a connection to a wired network. The first beacon device 200 that may be connected to the wireless AP device 600 is not limited to a particular device, but one or a plurality of the first beacon devices 200 may be connected to the wireless AP device 600. Conversely, there may be a plurality of the wireless AP devices 600, which may be connected to one or the plurality of the first beacon devices 200.

Each of the first beacon device 200 does not necessarily manage a single second beacon device 300, but may manage a plurality of the second beacon devices 300. In the example of FIG. 2, it can be seen that the first beacon device 200A manages two second beacon devices 300A and 300B, and the first beacon device 200B manages two second beacon devices 300C and 300D.

The first beacon device 200 and the second beacon device 300 may be connected by through pairing and bonding. A plurality of the second beacon devices 300 may be connected to the first beacon device 200 in various topologies such as a star topology or a ring topology.

In particular, in the present disclosure, the first beacon device 200 may be connected to the second beacon device 300 through the personal area network (PAN), and may transmit a specific command message or a request message to the second beacon device 300 to manage and control the second beacon device 300.

Each of the first beacon device 200 is not necessarily connected to one of the second beacon devices 300. Instead, each of the first beacon device 200 may manage a plurality of the second beacon devices 300, and some of the first beacon devices 200 may be connected to another first beacon device 200 through the PAN.

Here, the local communication scheme between the first beacon devices 200 may be different from the local communication scheme between the first beacon device 200 and the second beacon device 300.

Also, the first beacon device 200 may be controlled by the service device 400 through the communications network 500, and may change its own connection status according to the status of the wireless AP device 600 connected thereto.

Also, the first beacon device 200 may be controlled by the service device 400 through the communications network 500.

The first beacon devices 200 may be divided into upper layer devices and lower layer devices. Based on a specific first beacon device 200A, the first beacon device 200B closer to the wireless AP device 600 than the specific first beacon device 200A is categorized into the upper layer device. On the other hand, any first beacon farther from the wireless AP device 600 than the specific first beacon device 200A may be categorized into the lower layer device.

Meanwhile, in a viewpoint of an arbitrary beacon device, a beacon device connected to the arbitrary beacon device and existing in an upper layer is referred to as a parent node, another beacon device connected to the arbitrary beacon device and existing in a lower layer is referred to as a child node, and another beacon device existing in the same layer as the arbitrary beacon device is referred to as a sibling node.

In FIG. 2, the first beacon device 200B is the parent node of the first beacon device 200A, the first beacon device 200A is the child node of the first beacon device 200B, and the second beacon devices 300A and 300A are sibling nodes of each other.

The first beacon device 200 and the second beacon device 300 according to an embodiment of the present disclosure may transmit authentication keys and location information to the service device 400 through the wireless AP device 600 and the communications network 500.

The detailed configuration of the first beacon device 200 and the second beacon device 300 according to an embodiment of the present disclosure will be described below.

The wireless AP device 600 is connected to the first beacon device 200 to allow the beacon devices 900 connected in wireless links to access the communications network 500, and enables to construct a wireless mesh network which has a structure similar to a wired mesh network.

In such a mesh network, if a beacon device among a plurality of beacon devices does not operate or malfunctions, a user terminal device located in the vicinity of the inoperable or malfunctioning beacon device cannot receive beacon services.

In particular, if the first beacon device 200 which manages the second beacon device 300 does not operate or malfunctions due to hacking or a failure, a plurality of the second beacon devices 300 cannot operate normally.

Also, if the wireless AP device 600 does not operate or malfunctions due to a failure or contamination, the communication between the beacon device 900 and the service device 400 cannot be established, which makes management of the beacon device 900 difficult.

Particularly, since the second beacon device 300 is managed by the first beacon device 200 and a plurality of the first beacon devices 200 are connected to the wireless AP device 600, an abnormality in the wireless AP device 600 may result in abnormal operation of the first beacon devices 200 connected to the wireless AP device 600 and a plurality of second beacon devices 300 connected to the first beacon device 200.

Until now, described was a mesh network around the beacon device 900 in the overall system performing the wireless mesh network management method according to an embodiment of the present disclosure.

The first beacon device 200 and the second beacon device 300 for performing the wireless mesh network management method according to an embodiment of the present disclosure will now be described in detail.

Figure 3:
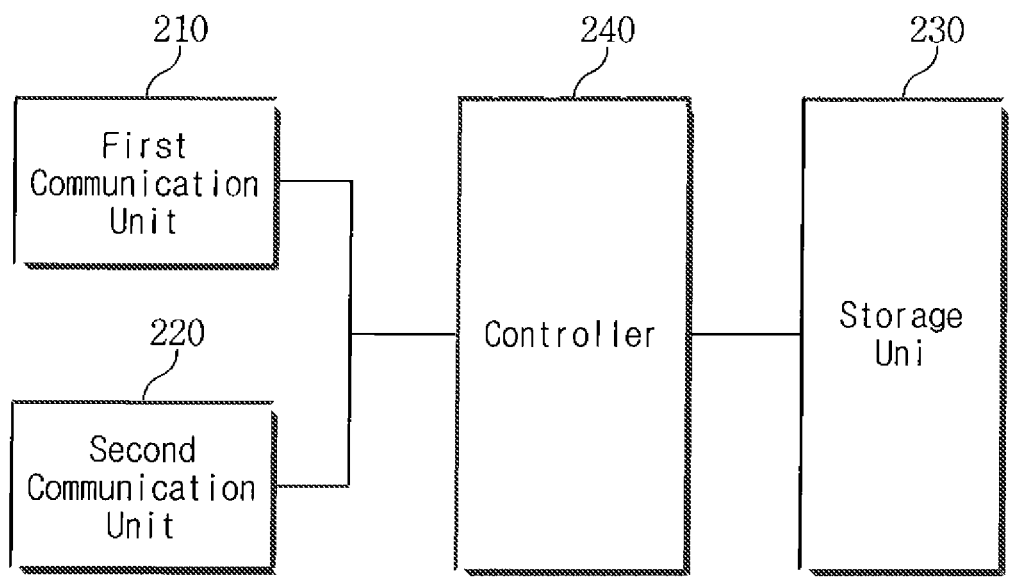
FIG. 3 is a block diagram of a first beacon device according to an embodiment of the present disclosure.

FIG. 3 is a block diagram of the first beacon device for performing the wireless mesh network management method according to an embodiment of the present disclosure.

Referring to FIG. 3. the first beacon device 200 according to an embodiment of the present disclosure performs an authentication of a wireless network by using a mesh network, and may include a first communication unit 210, a second communication unit 220, a storage unit 230, and a controller 240.

The first communication unit 210 and the second communication unit 220, which transmit and receive data to and from an external source, may be implemented by a network interface card, or an equivalent software such as a network driver interface specification (NDIS) stack, an equivalent hardware, and/or a logical combination of the software and hardware. Such communication units can support various communication protocols. For example, the communication units 210 and 220 can support various mobile communication standards such as Advanced Mobile Phone System (AMPS), Code Division Multiple Access (CDMA), Global System for Mobile Communications (GSM), Wideband Code Division Multiple Access (WCDMA), High Speed Downlink Packet Access (HSDPA), Long Term Evolution (LTE), and LTE Advanced (LTE-A), and can support short-range wireless network technologies such as BLE and Zigbee. Besides, the communication units 210 and 220 can support wired communication standards such as Ethernet (Ethernet), Home Phoneline-Networking-Alliance (Home PNA), and Power Line Communications (PLC).

The first communication unit 210 may be connected to the first communication unit 210 of another first beacon device 200. Also, the first communication unit 210 may be connected to the wireless AP device 600 to communicate with the service device 400 via the communications network 500.

The first communication unit 210 may be suitable for a wireless communications scheme such as the WLAN, the Wi-Fi, a wireless broadband Internet (Wibro), a Worldwide Interoperability for Microwave Access (WiMAX), and the HSDPA. However, the present disclosure is not limited thereto, but first communication unit 210 may be suitable for a wired communications scheme such as the Ethernet, a Digital Subscriber Line (xDSL) such as a Asymmetric Digital Subscriber Line (ADSL) and a Very High Bitrate Digital Subscriber Line (VDSL), a Hybrid Fiber Coaxial Cable (HFC), a Fiber-to-the-Curb (FTTC), and a fiber-to-the-home (FTTH).

The second communication unit 220 transmits and receives signals and various data for maintaining a wireless connection with the second beacon device 300. Here, the second communication unit 220 may perform the communications with the second beacon device 300 according to a Personal Area Network (PAN) communication scheme such as Bluetooth.

The storage unit 230 is configured to store data or programs executed or processed by the controller 240. Basically, the storage unit 230 may store an operating system (OS) for booting, maintaining, and operating the above configurations of the first beacon device 200, and application programs for performing functions of the first beacon device 200.

Particularly, according to the present disclosure, the storage unit 230 of any first beacon device 200 may register information about another first beacon device 200 in the vicinity of the first beacon device 200 and information of the second beacon device 300. Here, stored information includes location of each of the beacon devices 900. In addition, the storage unit 230 may store information about the wireless AP device 600 in its vicinity.

The information about the beacon device 900 or the wireless AP device 600 may serve as a list of spare devices that are available as replacement devices when a transmission failure occurs in communications between the first beacon device 200 and a device to which the first beacon device 200 is currently connected.

The storage unit 230 may include a main memory device such as read-only memory (ROM) and a random access memory (RAM), and an auxiliary storage device such as a hard disk, a magnetic media, an optical media, and a magneto-optical media. The storage unit 230 may include a program area and a data area.

The controller 240 is configured to perform overall control of the first beacon device 200 and may be implemented by one or more processors. The processor may be a single-threaded processor. Alternatively, however, the processor may be a multithreaded processor. The function of the controller 240 may be performed by the execution of instructions stored in the storage unit 230 by one or more processors. The instructions may include interpretable codes such as, for example, JavaScript and ECMAScript, executable machine codes, or other kinds of instructions stored in the computer-readable medium.

The computer-readable recording medium on which programs for performing the wireless mesh network management method according to the present disclosure may be recorded in the storage unit 230 and loaded and executed by the controller 240.

In a wireless mesh network management method according to a first embodiment of the present disclosure, the controller 240 controls the first beacon device 200, according to a command received from the service device 400, to increase a transmission power, to disconnect another first beacon device 200 that is determined to be out of order, or to establish a connection to the other first beacon device 200 that is normal.

That is, when receiving a command to connect or disconnect to another beacon device 900 from the service device 400, the controller 240 controls the first communication unit 210 and the second communication unit 220 to execute the command.

In a wireless mesh network management method according to a second embodiment of the present disclosure, the controller 240 may perform firmware updating by itself, initialize the firmware, or check for unusual access attempts such as malignant code, hacking, virus, and so on according to the command received from the service device 400 through the administrator terminal device, and may execute a program to rule out the unusual access attempts.

In a wireless mesh network management method according to a third embodiment of the present disclosure, the controller 240 may the controller 240 may increase the transmission power to enlarge the coverage or change the transmission channel according to the command received from the service device 400 through the user terminal device. Also, the controller 240 may check whether the beacon device 900 that needs a setting change is in a state of being connected to another beacon device or in a state of being connected to the wireless AP device 600 and whether the beacon device 900 can be connected to the wireless AP device 600. When it is determined that the beacon device 900 is connected to another beacon device, the controller 240 may disconnect the beacon device 900 from the another beacon device and establish a connection to the wireless AP device 600. Alternatively, when it is determined that the beacon device 900 that needs the setting change is connected to another beacon device, the controller 240 may disconnect the beacon device 900 from the another beacon device and establish a connection to the other beacon device.

In a wireless mesh network management method according to a fourth embodiment of the present disclosure, the controller 240 may periodically transmit a state check message to the wireless AP device 600 and check a response from the wireless AP device 600. If the wireless AP device 600 does not respond to the state check message for a predetermined time or longer, the controller 240 may determine that an abnormal state has occurred in the wireless AP device 600. In such a case, the controller 240 may control the first beacon device 200 to increase the transmission power, disconnect the wireless AP device 600 that is determined to be in the abnormal state, or establish a connection to another wireless AP device 600 or the first beacon device 200.

Also, the controller 240 may generate a command to cause the second beacon device 300 coupled thereto to establish a connection to another first beacon device 200, and transmit the command to the second beacon device 300 through the second communication unit 220.

That is, the controller 240 may generate command for the first beacon device 200 to disconnect or establish a connection to the wireless AP device 600 or another beacon device 900 through the wireless mesh network, and control the first communication unit 210 and the second communication unit 220 perform the command.

In each embodiment, the controller 240 may transmit its location information to the service device 400 via the first beacon device 200 in its upper layer and the communications network 500. However, the location information may be included in the identification information of the beacon signal transmitted by the first beacon device 200 to be transferred to the service device 400 via the mobile terminal device 100.

The first beacon device 200 according to an embodiment of the present disclosure has been described above.

The configuration and operation of the second beacon device 300 according to an embodiment of the present disclosure will now be described in detail.

Figure 4:
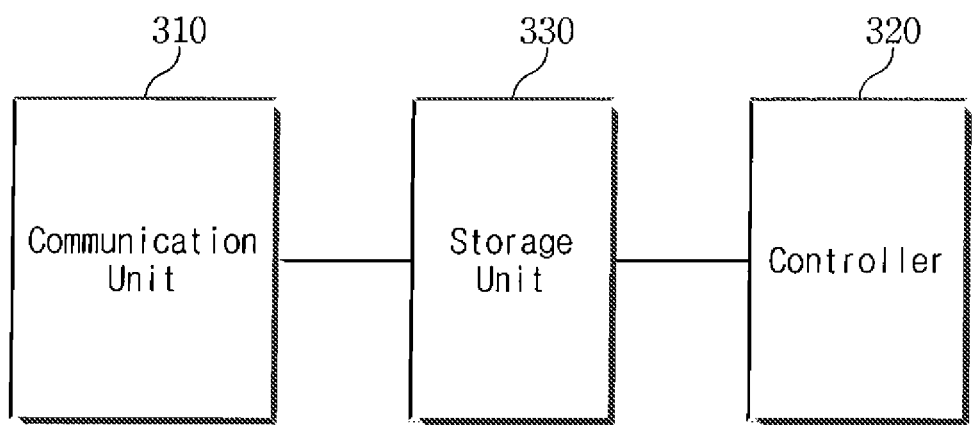
FIG. 4 is a block diagram of a second beacon device according to an embodiment of the present disclosure.

FIG. 4 is a block diagram of the second beacon device 300 for performing the wireless mesh network management method according to an embodiment of the present disclosure.

Referring to FIG. 4. the second beacon device 300 according to an embodiment of the present disclosure may include a communication unit 310, a controller 320, and a communication unit 330.

The communication unit 310, which transmits and receives data to and from an external source similarly to the first communication unit 210 of the first beacon device 200, may be implemented by a network interface card, or an equivalent software such as the NDIS stack, an equivalent hardware, and/or a logical combination of the software and hardware.

The communication unit 310 periodically or non-periodically transmits and receives various signals various data for maintaining the wireless connection with the first beacon device 200. The communication unit 310 may transmit its location information to the first beacon device 200 connected thereto, so that the first beacon device 200 transfers the location information to the service device 400 through the communications network 500 via the first beacon device 200 in its upper layer and the wireless AP device 600. The communication unit 310 may perform the communications according to the PAN communication scheme such as the Bluetooth.

The storage unit 320 is configured to store data or programs executed or processed by the controller 330. Basically, the storage unit 320 may store an operating system (OS) for booting, maintaining, and operating the above configurations of the second beacon device 300, and application programs for performing functions of the second beacon device 300. The storage unit 320 may include a program area and a data area, and stores an application program required for a functional operation of the second beacon device 300. When a function of the second beacon device 300 is to be activated in response to a request of the user, a corresponding application program is executed under the control of the controller 330 to perform the function.

Similarly to the storage unit 230 of the first beacon device 200, the storage unit 320 of the second beacon device 300 may register information about the first beacon device 200 and another second beacon devices 300 in its vicinity. The stored information includes location of each of the beacon devices 900. In addition, the storage unit 320 may store information about the wireless AP device 600 in its vicinity. The information about the beacon device 900 or the wireless AP device 600 may serve as a list of spare devices that are available as replacement devices.

The controller 240 is configured to perform overall control of the second beacon device 300 and may be implemented by one or more processors. The processor may be a single-threaded processor. Alternatively, however, the processor may be a multithreaded processor. The function of the controller 330 may be performed by the execution of instructions stored in the storage unit 320 by one or more processors. The instructions may include interpretable codes such as, for example, JavaScript and ECMAScript, executable machine codes, or other kinds of instructions stored in the computer-readable medium.

The computer-readable recording medium on which programs for performing the wireless mesh network management method according to the present disclosure may be recorded in the storage unit 320 and loaded and executed by the controller 330.

When the wireless mesh network management method according to the present disclosure is carried out, the location information of the second beacon device 300 may be transmitted to the service device 400 through the first beacon device 300 in the upper layer and the communications network 500. However, the location information may be included in the identification information of the beacon signal transmitted by the second beacon device 300 to be transferred to the service device 400 via the mobile terminal device 100.

Also, when the controller 240 receives a wireless mesh network forming command from the service device 400, the controller 240 may execute the command by controlling the communication unit 310.

In addition to the command transmitted by the service device 400, the controller 240 of the second beacon device 300 may receive a message to change the connection state of the wireless mesh network from the first beacon device 200. In response to the message, the controller 240 may control the communication unit 310 to disconnect a connection to one of the first beacon devices 200 currently being connected and establish a connection to another first beacon device 200.

The second beacon device 300 according to an embodiment of the present disclosure has been described above.

The configuration of the service device 400 according to an embodiment of the present disclosure will now be described in detail.

Figure 5:
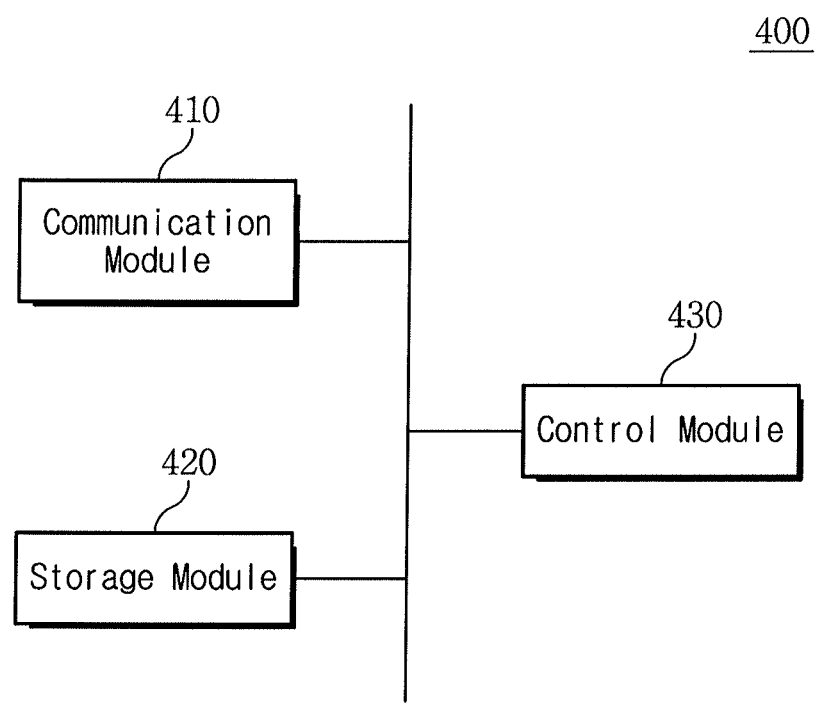
FIG. 5 is a block diagram of a service device according to an embodiment of the present disclosure.

FIG. 5 is a block diagram of the service device 400 for performing the wireless mesh network management method according to an embodiment of the present disclosure.

Referring to FIG. 5, the service device 400 according to an embodiment of the present disclosure may include a communication module 410, a storage module 420, and a control module 430.

The communication module 410, which is configured to transmit and receive data to and from an external source, may be connected to the beacon device 900 through the communications network 500 and the wireless AP device 600. Also, the communication module 410 may collect location information from the beacon device 900 or the mobile terminal device 100. Further, the communication module 410 may support communications between the service device 400 and the beacon device 900 or the mobile terminal device 100. For example, the control module 430 may transmit a command generated by the control module 430 to the beacon device 900.

The storage module 420 may store information about one or more beacon devices 900 constituting the wireless mesh network. Also, the storage module 420 may store information about the wireless AP device 600 that may be connected by the first beacon device 200, and information of channels that may be changed by the beacon device 900.

In addition, the storage module 420 may store the statistic values of the service traffic volume measured for each beacon device in the normal state, and may store network management information for each device constituting the wireless mesh network. The network management information may include a mapping table that maps the identification information of each beacon device to the location information of the beacon device. Thus, when a beacon device is out of order, it may be determined with reference to the mapping table which of the other beacon devices 900 in the vicinity is to be chosen to increase the transmit power to change a connection topology.

Also, the storage module 420 may store information about the administrator terminal device that manages the wireless mesh network (hereinbelow, referred to as 'administrator information'). In particular, the administrator information may include a connection schedule of the administrator terminal device to the beacon device 900 such as a movement path and a movement time of the administrator terminal device in the wireless mesh network.

The control module 430 is configured to perform overall control of the service device 400 and may be implemented by one or more processors. The processor may be a single-threaded processor. Alternatively, however, the processor may be a multithreaded processor. The function of the control module 430 may be performed by the execution of instructions stored in the storage unit 230 by one or more processors. The instructions may include interpretable codes such as, for example, JavaScript and ECMAScript, executable machine codes, or other kinds of instructions stored in the computer-readable medium.

In particular, the control module 430 according to the present disclosure may monitor the volume of the service traffic generated correspondingly to one or more beacon devices by each beacon device. Here, the service traffic of the beacon device 900 may be generated by communications with another beacon device 900 or a signal reception of the user terminal device 100. For example, after the mobile terminal device 100 receives the beacon signal transmitted by the beacon device 900, the service traffic corresponding to the beacon device 900 may be generated between the mobile terminal device 100 and the service device 400. The service traffic caused by the mobile terminal device 100 may be represented by a number of the mobile terminal devices 100 receiving the signal of the beacon device 900, or an amount of data transmitted by the mobile terminal device 100.

An average volume of the service traffic corresponding to the beacon device in a state that there is no failure or contamination may be set as the statistic value of the service traffic in the normal state. Alternatively, a certain variation range of the service traffic volume may be set as the statistic value of the service traffic in the normal state after measuring fluctuations of the service traffic for each beacon device in the normal state. The control module 430 may set a first and second threshold values for determining the abnormality of the beacon device 900 based on the statistic value of the service traffic in the normal state.

If the control module 430 finds a beacon device 900 of which service traffic volume decreases sharply while monitoring the service traffic volume for each beacon device 900, the control module 430 may determine that the beacon device 900 is abnormal or needs to change its setting.

Here, there are two methods of determining the abnormality of the beacon device 900 according to the change of the service traffic volume. In an embodiment, the control module 430 of the service device 400 may compare the current service traffic volume of each beacon device 900 with the statistic value of the service traffic volume in the normal state and determine that the corresponding beacon device 900 is abnormal when the difference between the current service traffic volume and the statistic value of the service traffic volume is greater than the first threshold value. In another embodiment, the control module 430 may determine that the beacon device 900 is abnormal when the current service traffic volume is less than the second threshold value.

Even when the difference between the service traffic volume and the statistic value of the service traffic volume is less than the first threshold value and thus the beacon device 900 is determined to be normal, the control module 430 may determine that a setting change is required if the difference is greater than a third threshold value.

According to another embodiment, the control module 430 may compare the volume of the service traffic generated for a predetermined time with a target volume of the service traffic previously set and stored in the storage module 420, and determine that a setting change for increasing the service traffic volume is required when the difference is greater than a fourth threshold value.

According to the first embodiment, when it is determined that there is an abnormal beacon device, the control module 430 may control at least one beacon device 900 located within a certain range from the abnormal beacon device to increase the transmission power so that the coverage of the at least one beacon devices 900 is enlarged, and may control the beacon device 900 connected to the abnormal beacon device to establish a new connection to the beacon device 900 whose coverage is enlarged.

That is, when there is an abnormal beacon device, the control module 430 may choose at least one beacon device 900 by using the network management information stored in the storage module 420, and controls the chosen beacon device 900 to increase the transmission power and enlarge the coverage. Afterwards, the control module 430 controls the beacon devices connected to the lower layer of the abnormal beacon device to be disconnected from the abnormal beacon device and establish a new connection to the beacon device 900 whose coverage is enlarged.

According to the second embodiment, when it is determined that there is an abnormal beacon device, the control module 430 may choose the administrator terminal device for checking the abnormal beacon device.

A criterion for choosing the administrator terminal device to check the abnormal beacon device may be a distance from the abnormal beacon device. That is, an administrator terminal device searched within a predetermined range from the abnormal beacon device may be chosen as the administrator terminal device for checking the abnormal beacon device.

Alternatively, the control module 430 may use the administrator information of the administrator terminal device stored in the storage module 420. Among the administrator terminal devices scheduled to approach the abnormal beacon device, the administrator terminal device scheduled to approach the abnormal beacon device in the shortest time may be chosen as the administrator terminal device for checking the abnormal beacon device.

After the administrator terminal device for checking the abnormal beacon device 900 is chosen, the control module 430 may transmit the information of the abnormal beacon device to the chosen administrator terminal device.

The administrator terminal device may access the abnormal beacon device 900 and connect the abnormal beacon device 900 to the service device 400. After the abnormal beacon device is connected to the service device 400, the control module 430 of the service device 400 may send a message for remotely checking the abnormal beacon device 900 to the abnormal beacon device 900 through the administrator terminal device.

The remote checking may be performed to detect the contamination of the abnormal beacon device by using a software suitable for detecting the unusual access attempts such as the virus, the malignant code, and hacking, or to perform firmware updating of the abnormal beacon device 900 or initialize the firmware.

According to the third embodiment, if it is determined that there is a beacon device 900 that requires the setting change, the control module 430 may search for an arbitrary user terminal device for use in changing the setting of the beacon device 900.

Here, a user terminal device within a predetermined range from the beacon device 900 of which setting is to be changed may be searched as the user terminal device for use in changing the setting of the beacon device 900.

After the user terminal device for use in changing the setting of the beacon device 900 is found, the control module 430 may transmit the information of the abnormal beacon device to the searched user terminal device.

Accordingly, the user terminal device may access the beacon device 900 of which setting is to be changed to connect the beacon device 900 to the service device 400. After the beacon device is connected to the service device 400, the control module 430 of the service device 400 may send a message for the setting change to the beacon device 900 through the user terminal device.

The setting change may be performed to increase the transmission power of the beacon device 900 to enlarge the coverage and increase the service traffic volume, or to change the channel by disconnecting the currently connected beacon device and establish a connection to another beacon device or the wireless AP device 600.

Such a control may be performed in the background of the user terminal device functioning as the message transmission path so that the user terminal device cannot recognize the control.

The control module 430 may notify a situation to the administrator of the service device 400 if there happens a situation that: an abnormality is found in a certain beacon device 900, a setting change is required in a beacon device 900, the administrator terminal device connects the beacon device 900 to the service device 400, the user terminal device connects the beacon device 900 to the service device 400, a checking or setting change is initiated or completed, or a connection state of the wireless mesh network is changed. The notification may be carried out through a separate output device (not shown) or by sending a user message.

The output device (not shown) may be a display device or an audio device connected to the service device 400, or a separate computing device configured to manage the service device 400.

In case of transmitting the user message, a configuration file collection completion message may be delivered to the administrator of the service device 400 by a Short Messaging Service (SMS), a Multimedia Messaging Service (MMS), a mobile messenger, or a separate computer program configured to carry out the present disclosure.

Detailed operation of the service device 400 according to the embodiments of the present disclosure will be more clearly understood by the following flowcharts and block diagrams.

The wireless mesh network management method according to a first embodiment of the present disclosure will now be described in detail with reference to FIGS. 6 and 7.

Figure 6:
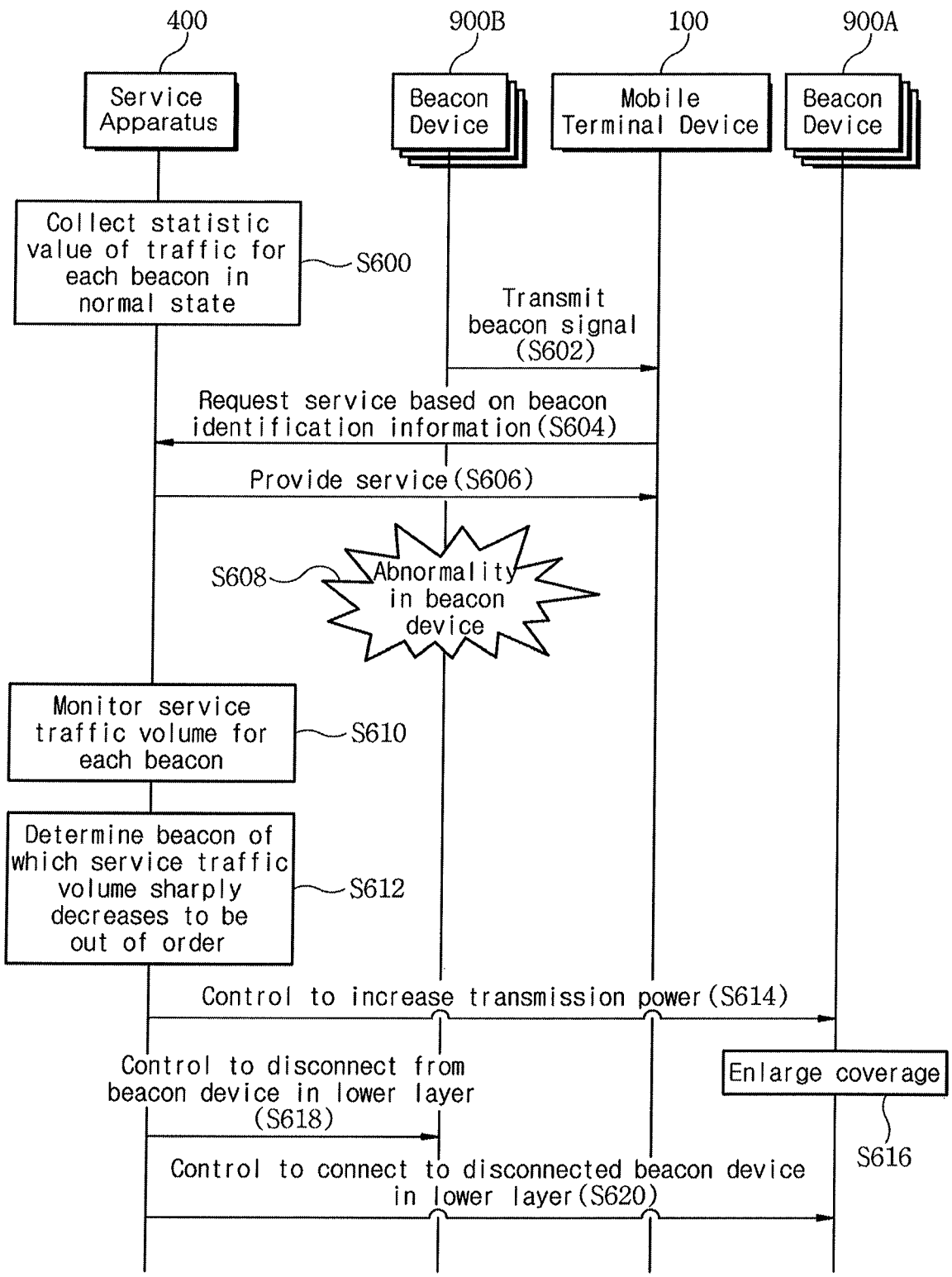
FIG. 6 is a message flowchart illustrating a process of performing the wireless mesh network management method according to a first embodiment of the present disclosure.

FIG. 6 is a message flowchart illustrating a process of performing the wireless mesh network management method according to the first embodiment of the present disclosure.

Referring to FIG. 6, the service device 400 first performs a beacon service with the mobile terminal device 100 through the beacon device 900A, and collects statistic values of the traffic volume while the beacon service is normally performed (S600).

The process of performing the beacon service is as follows. After the mobile terminal device 100 receives the beacon signal transmitted by the beacon device 900A (S602), a beacon service related application installed in the mobile terminal device 100 may request the service device 400 to provide a service based on beacon identification information (S604). In response to the request, the service device 400 may provide the service requested by the application (S606).

During this process, an abnormal state such as the failure or contamination may occur in a specific beacon device 900A (S608).

As an example of the abnormality, while the service device 400 monitors the service traffic volume of the beacon devices 900A (S610), the service device 400 may detect a sharp decrease in the service traffic volume of a beacon device 900A. In this case, it is determined that an abnormal state has occurred in the beacon device 900A (S612).

As mentioned above, the service device 400 may determine that the beacon device 900A is abnormal when the difference between the current service traffic volume and the statistic value of the service traffic volume in the normal state is greater than the first threshold value or when the current service traffic volume is less than the second threshold value and is insufficient for performing the service.

If it is determined that the beacon device 900A is abnormal, the service device 400 may transmit a message for controlling to increase the transmission power to one or more of the another beacon devices 900B within a certain range among the replacement devices in the spare device list stored in the storage unit 230 (S614).

Accordingly, the coverage of the beacon device 900B is enlarged (S616), and the service device 400 transmits, to the beacon devices which were previously connected in the lower layer of the beacon device 900A, a message to disconnect from the beacon device 900A and control the beacon devices to establish a new connection to the beacon device 900B (S618 and S620). Thus, the connections of the mesh network is changed.

Figure 7:
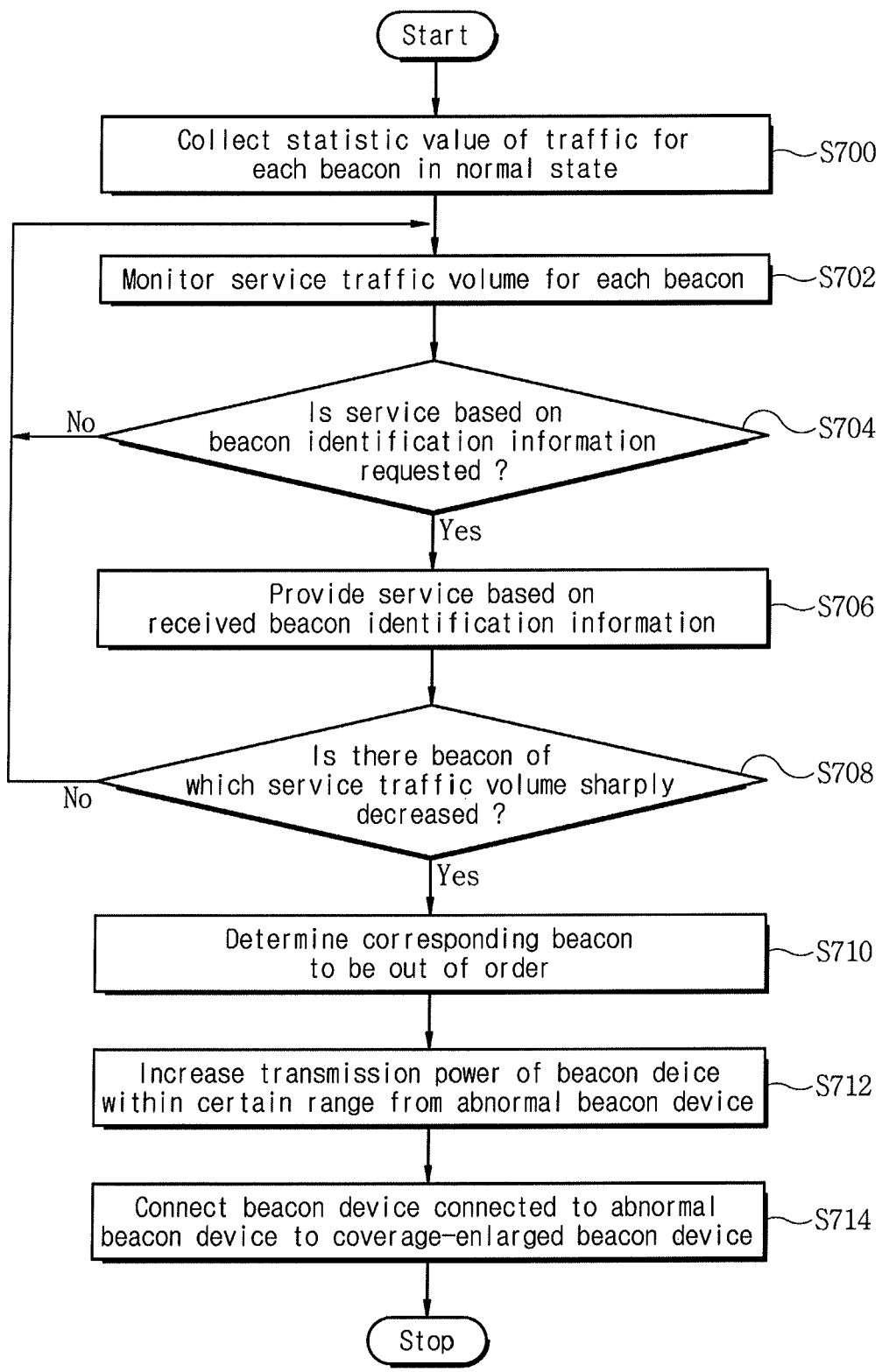
FIG. 7 is a flowchart illustrating an operation of the service device for use in performing the wireless mesh network management method according to the first embodiment of the present disclosure.

FIG. 7 is a flowchart illustrating the operation of the service device 400 performing the wireless mesh network management method according to the first embodiment of the present disclosure.

Referring to FIG. 7, the service device 400 first collects the statistic value of the service traffic volume in the normal state for each of the beacon devices 900, and stores an average service traffic volume of each beacon device 900 (S700).

Also, the service device 400 monitors the service traffic volume for each of the beacon devices 900 (S702).

Afterwards, when there is a service request based on the beacon identification information from the mobile terminal device 100 (S704), the service device 400 checks the service corresponding to the received beacon identification information and provides the service to the mobile terminal device 100 (S706).

When the service device 400 happens to find a the beacon device 900 of which service traffic volume sharply decreased while monitoring the service traffic volume for each of the beacon devices 900 (S708), the service device 400 determines that an abnormality such as the failure or the contamination occurred for the beacon device (S710).

There are two methods of determining whether the beacon device 900 is abnormal or not according to the change of the service traffic volume.

First, the service device 400 may compare the current service traffic volume with the statistic value of the service traffic volume in the normal state and determine the corresponding beacon device to be abnormal when the difference between the current service traffic volume and the statistic value of the service traffic volume in the normal state is greater than the first threshold value. That is, the service device 400 may continually compare the service traffic volume for each beacon device with the statistic value of the service traffic volume in the normal state, and determine that the corresponding beacon device is abnormal when the service traffic decreases sharply.

Second, the service device 400 may determine that the corresponding beacon device is abnormal when the current service traffic volume is less than the second threshold value.

If the beacon device 900 is determined to be abnormal, the service device 400 may control the beacon device 900 within a certain range from the abnormal beacon device 900 to increase the transmission power and enlarge the coverage (S712).

Here, information about the beacon device 900 of which transmission power is to be increased may be stored in the service device 400 as the network management information. The network management information stored in the service device 400 may be constructed based on the location information transmitted by each beacon device 900.

Subsequently, the service device 400 may control the beacon devices 900 so that the beacon device 900 connected to the lower layer of the abnormal beacon device 900 establishes a new connection to the beacon device 900 of which coverage is enlarged (S714). Thus, the connections of the mesh network is changed.

The wireless mesh network management method according to the first embodiment of the present disclosure has been described above.

The wireless mesh network management method according to a second embodiment of the present disclosure will now be described in detail.

Figure 8:
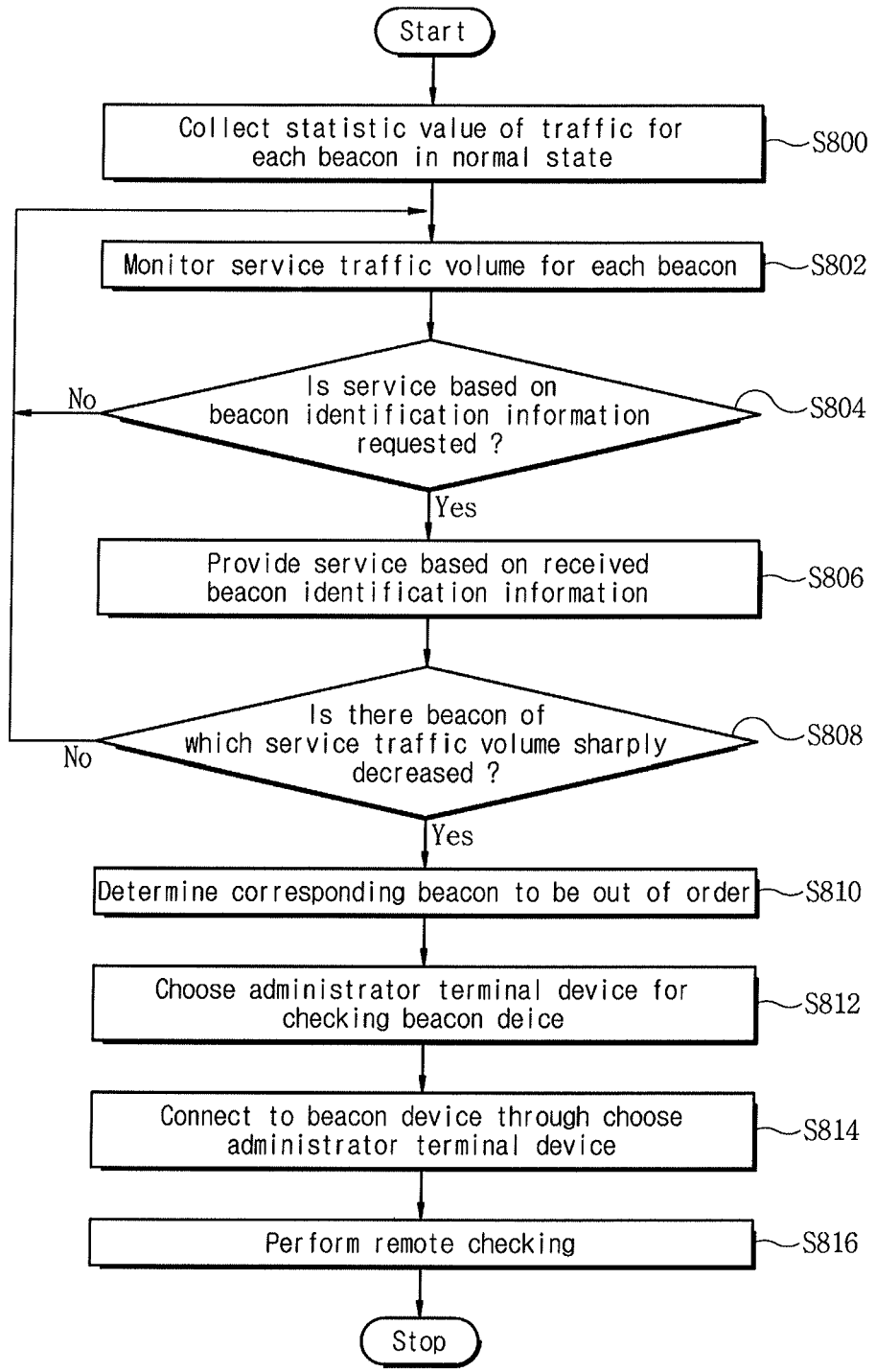
FIG. 8 is a flowchart illustrating an operation of the service device for use in performing the wireless mesh network management method according to a second embodiment of the present disclosure.

FIG. 8 is a flowchart illustrating the operation of the service device 400 performing the wireless mesh network management method according to the second embodiment of the present disclosure.

Referring to FIG. 8, the service device 400 first collects the statistic value of the service traffic volume in the normal state for each of the beacon devices 900, and stores an average service traffic volume of each beacon device 900 (S800).

Also, the service device 400 monitors the service traffic volume for each of the beacon devices 900 (S802).

Afterwards, when there is a service request based on the beacon identification information from the mobile terminal device 100 (S804), the service device 400 checks the service corresponding to the received beacon identification information and provides the service to the mobile terminal device 100 (S806).

When the service device 400 happens to find a the beacon device 900 of which service traffic volume sharply decreased while monitoring the service traffic volume for each of the beacon devices 900 (S808), the service device 400 determines that an abnormality such as the failure or the contamination occurred for the beacon device (S810).

There are two methods of determining whether the beacon device 900 is abnormal or not according to the change of the service traffic volume.

First, the service device 400 may compare the current service traffic volume with the statistic value of the service traffic volume in the normal state and determine the corresponding beacon device to be abnormal when the difference between the current service traffic volume and the statistic value of the service traffic volume in the normal state is greater than the first threshold value. That is, the service device 400 may continually compare the service traffic volume for each beacon device with the statistic value of the service traffic volume in the normal state, and determine that the corresponding beacon device is abnormal when the service traffic decreases sharply.

Second, the service device 400 may determine that the corresponding beacon device is abnormal when the current service traffic volume is less than the second threshold value.

when it is determined that there is an abnormal beacon device 900, the control module 430 of, the service device 400 may choose the administrator terminal device for checking the abnormal beacon device (S812).

The criterion for choosing the administrator terminal device to check the abnormal beacon device may be the distance from the abnormal beacon device. That is, an administrator terminal device searched within a predetermined range from the abnormal beacon device may be chosen as the administrator terminal device for checking the abnormal beacon device.

Alternatively, the control module 430 of the service device 400 may use the administrator information of the administrator terminal device stored in the storage module 420. Among the administrator terminal devices scheduled to approach the abnormal beacon device, the administrator terminal device scheduled to approach the abnormal beacon device in the shortest time may be chosen as the administrator terminal device for checking the abnormal beacon device.

After the administrator terminal device for checking the abnormal beacon device 900 is chosen, the service device 400 may be connected to the abnormal beacon device 900 through the administrator terminal device (S814), and the service device 400 may remotely check the abnormal beacon device 900 by transmitting the information of the abnormal beacon device to the chosen administrator terminal device (S816).

Figure 9:
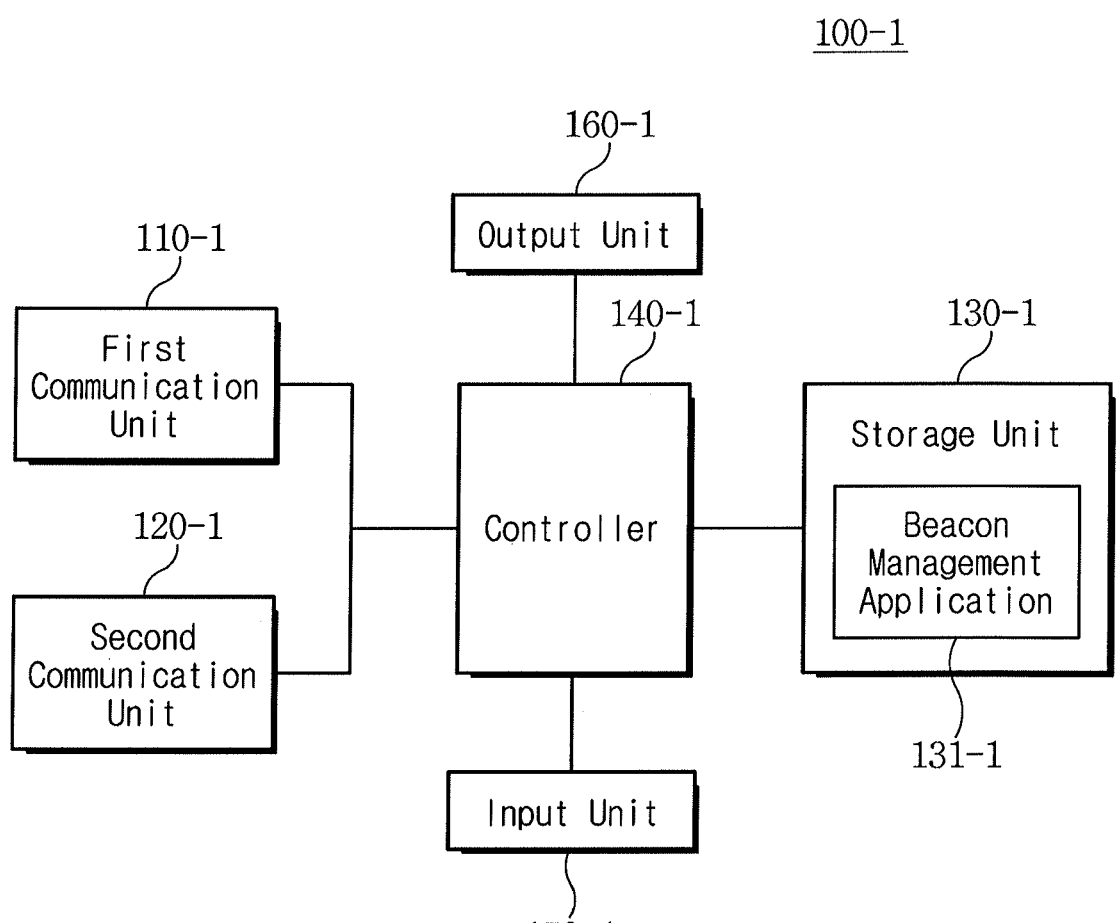
FIG. 9 is a block diagram of an administrator terminal device for use in performing the wireless mesh network management method according to the second embodiment of the present disclosure.

FIG. 9 is a block diagram of the administrator terminal device for use in performing the wireless mesh network management method according to the second embodiment of the present disclosure.

Referring to FIG. 9, the administrator terminal device 100-1 may include a first communication unit 110-1, a second communication unit 120-1, a storage unit 130-1, a controller 140-1, an output unit 160-1, and an input unit 150-1.

The controller 140-1 may be a processor device configured to execute an operating system (OS) and each configuration of the administrator terminal device.

The controller 140-1 of the administrator terminal device 100-1 may make the beacon signal received through the first communication unit 110-1 or the second communication unit 120-1 or the information received from the service device 400 to be exposed through the output unit 160-1, and make such information or data to be stored in the storage unit 130-1.

The first communication unit 110-1 may communicate with the service device 400 through the communications network 500. The first communication unit 110-1 may be suitable for the wireless communications scheme such as the WLAN, the Wi-Fi, the Wibro, the WiMAX, and the HSDPA.

The second communication unit 120-1 receives signals transmitted by the beacon device 900. The second communication unit 120-1 may perform the communications according to the PAN communication scheme such as Bluetooth The output unit 160-1 may display information of a series of operating states and operation results during the operation of the administrator terminal device 100-1. Also, the output unit 160-1 may display a menu of the administrator terminal device 100-1 and data input by the administrator. The output unit 160-1 may be a liquid crystal display (LCD), a thin film transistor LCD (TFT-LCD), a light emitting diode (LED), an organic light emitting diode (OLED), an active-matrix organic light emitting diode (AMOLED), a retina display, a flexible display, or a three-dimensional display. When the output unit 160-1 is implemented in a form of a touch screen, the output unit 160-1 may perform some or all of the functions of the input unit 150-1. The output unit 160-1 may output information related to the abnormal beacon device 900 received from the service device 400 while the abnormal beacon device 900 is connected to the service device 400 for checking.

The input unit 150-1 receives various information such as numbers and characters, and transfers signals related with function setting and function control of the administrator terminal device 100-1 to the controller 140-1. The input unit 150-1 may include at least one of a keypad and a touchpad that generates an input signal according to a touch or manipulation of the user. The input unit 150-1 and the output unit 160-1 may be incorporated into a single touch panel screen that may perform both the input and display functions. Any other type of input device that may be developed and available in the future in addition to a conventional input device such as a keyboard, the keypad, a mouse, a joystick, and the like may be used as the input unit 150-1.

The storage module 130-1, which is a device for storing data, includes a main memory device and an auxiliary storage device and stores application programs required for the functional operation of the administrator terminal device 100-1.

A beacon management application 131-1, which is one of the application programs installed in the administrator terminal device 100-1, may manage the wireless mesh network according to the present disclosure. The beacon management application 131-1 may connect the administrator terminal device 100-1 to the beacon device 900 and the service device 400. The beacon management application 131-1 may control the administrator terminal device 100-1 to receive the information of the abnormal beacon device 900 including the location information from the service device 400 and display the location information through the output unit 160-1, and to receive the message for the remote checking from the service device 400 to transfer to the beacon device 900. Also, the beacon management application 131-1 may access the beacon device by itself without intervention of the service device 400 and perform checking of the beacon device 900 to transmit the check result to the service device 400

Such a remote checking may be performed to detect the contamination of the abnormal beacon device 900 by using a software suitable for detecting the unusual access attempts such as the virus, the malignant code, and hacking, or to perform firmware updating of the abnormal beacon device 900 or initialize the firmware.

The configuration and operation of the administrator terminal device 100-1 according to the second embodiment of the present disclosure has been described above.

The wireless mesh network management method according to the second embodiment of the present disclosure has been described above.

The wireless mesh network management method according to a third embodiment of the present disclosure will now be described in detail.

Figure 10:
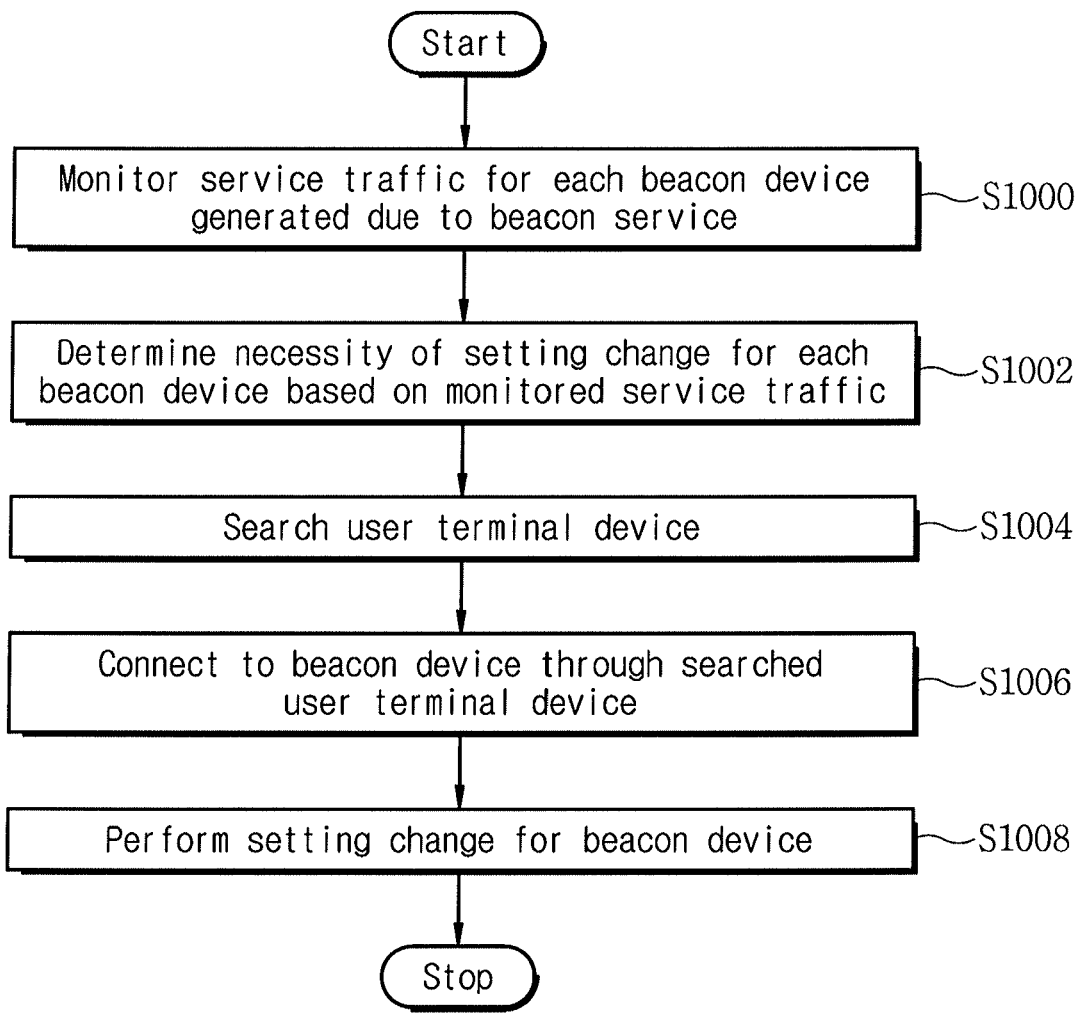
FIG. 10 is a flowchart illustrating an operation of the service device for use in performing the wireless mesh network management method according to a third embodiment of the present disclosure.

FIG. 10 is a flowchart illustrating an operation of the service device 400 for performing the wireless mesh network management method according to a third embodiment of the present disclosure.

Referring to FIG. 10, the service device 400 monitors the service traffic for each bean device 900 generated while the beacon service is provided (S1000).

Afterwards, the service device 400 determines whether the setting change is required or not for each beacon device 900 based on the monitored service traffic volume (S1002).

As described above, there are two methods of determining the setting change for the beacon device 900 is required or not according to the service traffic volume.

First, the service device 400 may compare the current service traffic volume with the statistic value of the service traffic volume in the normal state and determine that the corresponding beacon device is abnormal when the difference between the current service traffic volume and the statistic value of the service traffic volume in the normal state is greater than the first threshold value but is less than the third threshold value. That is, the service device 400 may continually compare the service traffic volume for each beacon device 900 with the statistic value of the service traffic volume in the normal state, and determine that the corresponding beacon device requires the setting change when the service traffic decreased but the decreased volume does not exceed a certain reference value. If the service traffic volume decreased so that the difference between the current service traffic volume and the statistic value exceeds the first threshold value, the service device 400 may determine that the beacon device 900 is abnormal and notify the situation to the administrator Second, there may be a target volume of the service traffic to be generated in the service device 400 which is set previously and stored in the storage module 420. The service device 400 may compare the service traffic volume with the target volume and determine that the beacon device requires the setting change to increase the service traffic volume when the difference between the service traffic volume and the target volume is greater than the fourth threshold value.

If the beacon device 900 determines that the beacon device 900 requires the setting change, the service device 400 searches for a user terminal device for use in changing the settings of the beacon device 900 (S1004).

When the user terminal device for use in changing the setting of the beacon device 900 is found, the service device 400 is connected to the beacon device 900 through the user terminal device (S1006), so that the service device 400 may change the setting of the beacon device 900 (S1008).

As mentioned above, the setting change may be performed to increase the transmission power of the beacon device 900 to enlarge the coverage and increase the service traffic volume, or to change the channel by disconnecting the currently connected beacon device and establish a connection to another beacon device or the wireless AP device 600.

Figure 11:
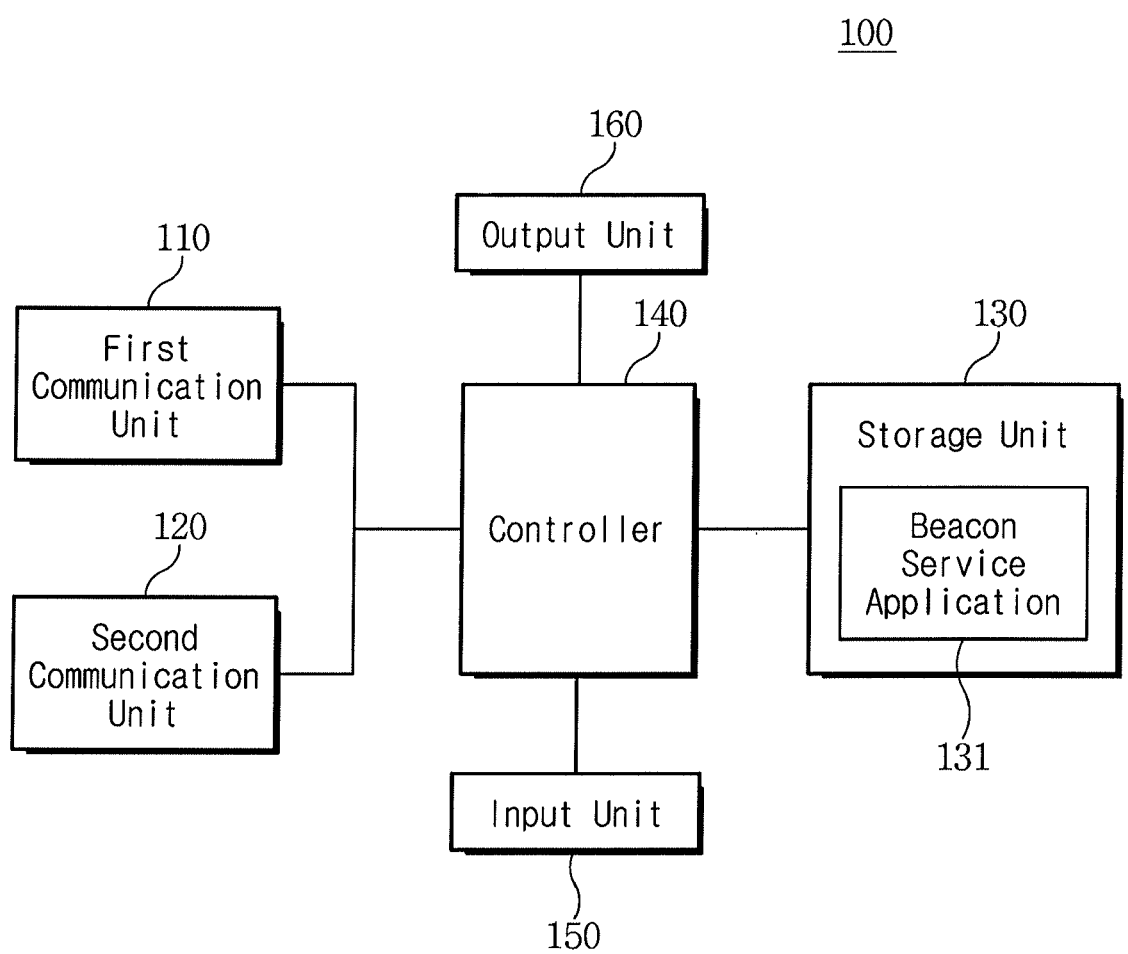
FIG. 11 is a block diagram of a mobile terminal device for use in performing the wireless mesh network management method according to the third embodiment of the present disclosure.

FIG. 11 is a block diagram of the mobile terminal device for use in performing the wireless mesh network management method according to the third embodiment of the present disclosure.

The user terminal device is a kind of the mobile terminal device 100, and has the same configuration as the mobile terminal device 100.

Referring to FIG. 11, the mobile terminal device 100 may include a first communication unit 110, a second communication unit 120, a storage unit 130, a controller 140, an output unit 160, and an input unit 150.

The controller 140 may be a processor device configured to execute an operating system (OS) and each configuration of the mobile terminal device.

The controller 140 of the mobile terminal device 100 may make the beacon signal received through the first communication unit 110 or the second communication unit 120 or the information received from the service device 400 to be exposed through the output unit 160, and make such information or data to be stored in the storage unit 130.

The first communication unit 110 may communicate with the service device 400 through the communications network 500. The first communication unit 110 may be suitable for the wireless communications scheme such as the WLAN, the Wi-Fi, the Wibro, the WiMAX, and the HSDPA.

The second communication unit 120 receives signals transmitted by the beacon device 900. The second communication unit 120 may perform the communications according to the PAN communication scheme such as Bluetooth The output unit 160 may display information of a series of operating states and operation results during the operation of the mobile terminal device 100. Also, the output unit 160 may display a menu of the mobile terminal device 100 and data input by the user. The output unit 160 may the LCD, the TFT-LCD, the LED, the OLED, the AMOLED, the retina display, the flexible display, or the three-dimensional display. When the output unit 160 is implemented in a form of a touch screen, the output unit 160 may perform some or all of the functions of the input unit 150. The output unit 160 may output information related to the abnormal beacon device 900 received from the service device 400 while the abnormal beacon device 900 is connected to the service device 400 for checking.

The input unit 150 receives various information such as numbers and characters, and transfers signals related with function setting and function control of the mobile terminal device 100 to the controller 140. The input unit 150 may include at least one of a keypad and a touchpad that generates an input signal according to a touch or manipulation of the administrator. The input unit 150 and the output unit 160 may be incorporated into a single touch panel screen that may perform both the input and display functions. Any other type of input device that may be developed and available in the future in addition to a conventional input device such as a keyboard, the keypad, a mouse, a joystick, and the like may be used as the input unit 150-1.

The storage module 130, which is a device for storing data, includes a main memory device and an auxiliary storage device and stores application programs required for the functional operation of the mobile terminal device 100.

A beacon service application 131, which is one of the application programs installed in the mobile terminal device 100, may be used to receive the beacon signal from the beacon device 900 located in the wireless mesh network according to the present disclosure to receive the beacon service based on the beacon signal. The beacon service application 131 may connect the mobile terminal device 100 to the beacon device 900 and the service device 400. The beacon service application 131 may control the mobile terminal device 100 to receive the information of the beacon device 900 that requires the setting change from the service device 400, and to receive the message for the remote checking from the service device 400 to transfer to the beacon device 900.

In case that the mobile terminal device 100 is a user terminal device, the setting change may be performed in the background of the user terminal device and may not be output through the output unit 160 so that the user cannot recognize the setting change.

The administrator terminal device 100-1 has the same configuration as the mobile terminal device 100 except that the administrator terminal device 100-1 includes the beacon management application 131-1 instead of the beacon service application 131.

The configuration and operation of the mobile terminal device 100 according to the third embodiment of the present disclosure has been described above.

The wireless mesh network management method according to the third embodiment of the present disclosure has been described above.

The wireless mesh network management method according to a fourth embodiment of the present disclosure will now be described in detail with reference to FIGS. 12 through 14.

Figure 12:
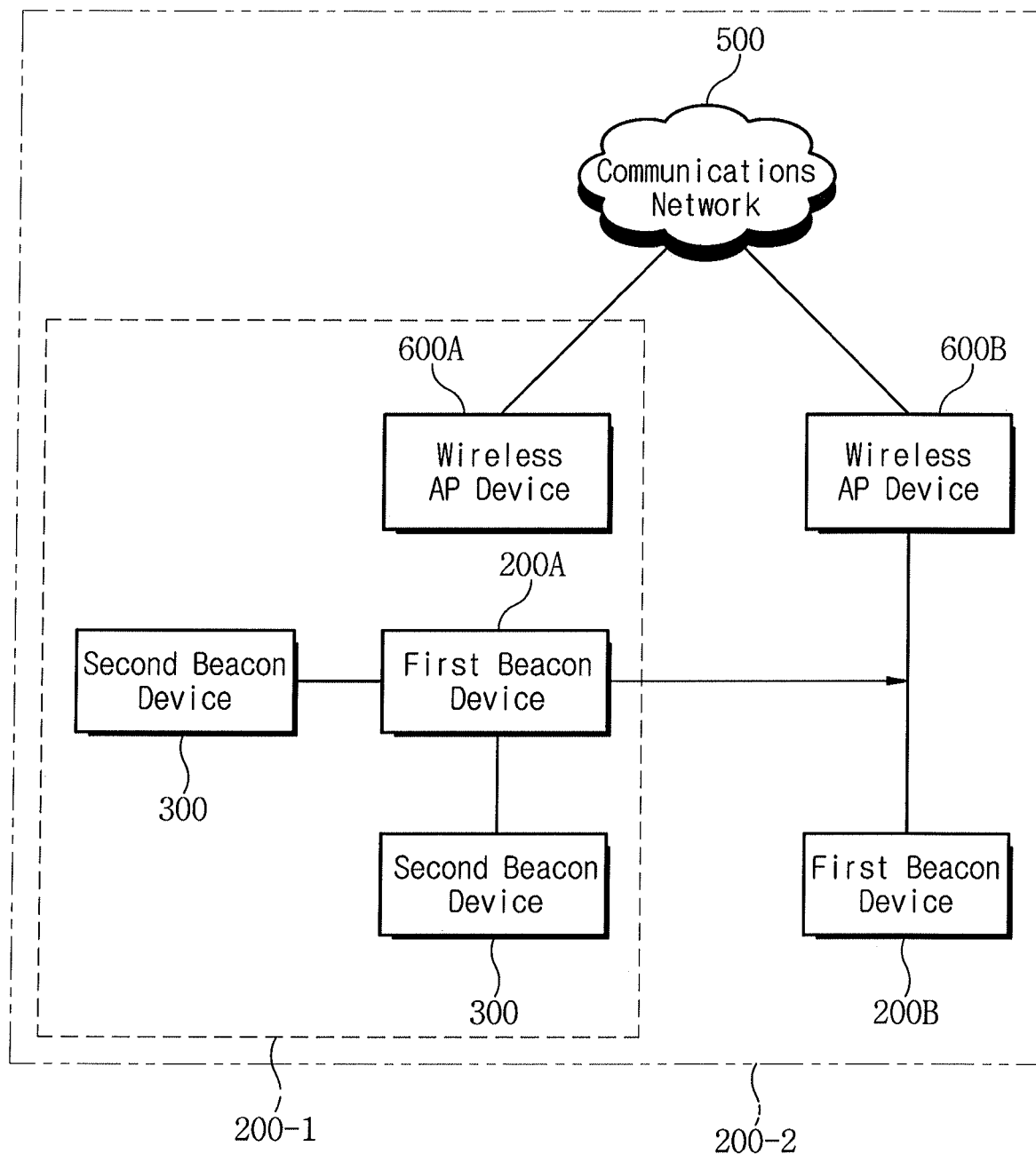
FIG. 12 is a schematic view of the wireless mesh network for explaining an example of the wireless mesh network management method according to a fourth embodiment of the present disclosure.

FIG. 12 is a schematic view of the wireless mesh network for explaining an example of the wireless mesh network management method according to the fourth embodiment of the present disclosure.

Referring to FIG. 12, the mesh network according to the present embodiment includes a plurality of wireless AP devices 600A and 600B connected to the communications network. Also, a first beacon device 200A managed by the administrator of the service device 400 and one or more second beacon devices 300 may be connected to a predetermined wireless AP device 600A to provide the beacon service.

In case that an abnormality occurs in the wireless AP device 600A, the communication between the service device 400 and the first beacon device 200A that is connected to the wireless AP device 600A may fail, which may cause a problem in providing the beacon service.

According to the present disclosure, when such a situation happens, the first beacon device 200A increases its transmission power by itself to enlarge the communication coverage. For example, if the coverage of the wireless AP device 600A in the normal state corresponds to an area 200-1, the coverage of the wireless AP device 600A in the abnormal state may be enlarged to an area 200-2.d If another wireless AP device 600B is found in the enlarged coverage, the first beacon device 200A may release the connection to the to the previously connected wireless AP device 600A, and requests a connection to the other wireless AP device 600B to change the connection state.

In case that no other wireless AP device is found even though the coverage is enlarged, the operations of further increasing the transmission power and searching for another device may be repeatedly carried out.

The first beacon device 200A may proceed to connect to another first beacon device 200B rather than the wireless AP device 600B. Alternatively, the second beacon devices 300 may be controlled to increase the transmission power so that the second beacon devices 300 which connected to the first beacon device 200A may be connected to the other first beacon device 200B. Also, the first beacon device 200B found after the searching operation may be controlled to increase the transmission power to enlarge the coverage and the second beacon devices 300 may be connected to the first beacon device 200B.

The first beacon device 200A connected to the abnormal wireless AP device 600A may have a difficulty in receiving a control message transmitted by the service device 400. Thus, the service device 400 may transmit the control message for enlarging the coverage to other devices directly.

Figure 13:
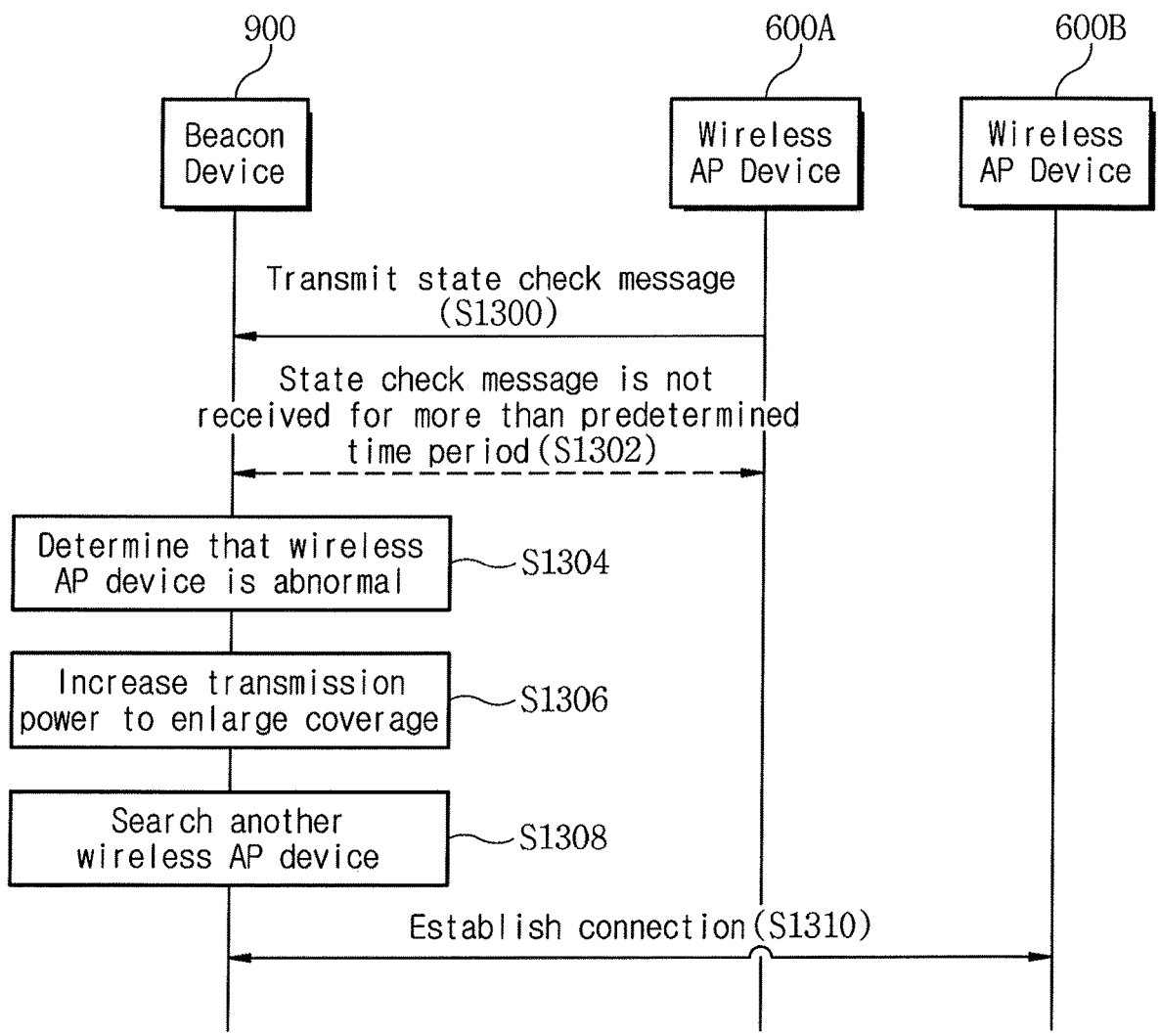
FIG. 13 is a message flowchart illustrating a process of performing the wireless mesh network management method according to the fourth embodiment of the present disclosure.

FIG. 13 is a message flowchart illustrating a process of performing the wireless mesh network management method according to a fourth embodiment of the present disclosure.

Referring to FIG. 13, the beacon device 900 periodically transmits a state check message to the wireless AP device 600A connected thereto to check the state of connection between the beacon device 900 and the wireless AP device 600A (S1300). This process may be performed in such a manner that the beacon device 900 transmits the state check message to the wireless AP device 600A and the wireless AP device 600A responds to the state check message.

During this process, if the beacon device 900 fails to receive a response message to the state check message from the wireless AP device 600A (S1302), the beacon device 900 may determine that an abnormality has occurred in the wireless AP device 600A (S1304).

If it is determined that an abnormality has occurred in the wireless AP device 600A connected to the beacon device 900, the beacon device 900 increases the transmission power by itself to enlarge its coverage (S1306). The beacon device 900 may search for another wireless AP device 600B in an enlarged coverage (S1308). If another wireless AP device 600B is found in the enlarged coverage, the beacon device 900 may release the connection to the wireless AP device 600A that was previously connected and request a newly found wireless AP device 600B to establish a new connection. Thus, the connection state of the wireless mesh network may be changed (S1310).

In case that no other wireless AP device 600B is found in the enlarged coverage, the operations of further increasing the transmission power and searching for another wireless AP device 600B may be repeatedly carried out. The transmission power that can be output by the beacon device 900 may be specified stepwise within a range of a maximum transmission power. In such a case, the beacon device 900 may increase transmission power stepwise to search for another wireless AP device 600B.

In addition, the beacon device 900 may try to establish a connection with another beacon device rather than the wireless AP device 600B as described above. Also, the beacon device 900 may control the beacon devices connected to the lower layer of the beacon device 900 to establish respective connections to the other beacon devices.

To this end, the beacon device 900 may control the beacon devices connected to the lower layer to increase the transmission power. Also, the other beacon device found in the searching operation may be controlled to increase the transmission power and enlarge the coverage, so that the beacon devices that have been connected to the lower layer of the beacon device 900 is newly connected to the beacon device found in the searching operation.

Figure 14:
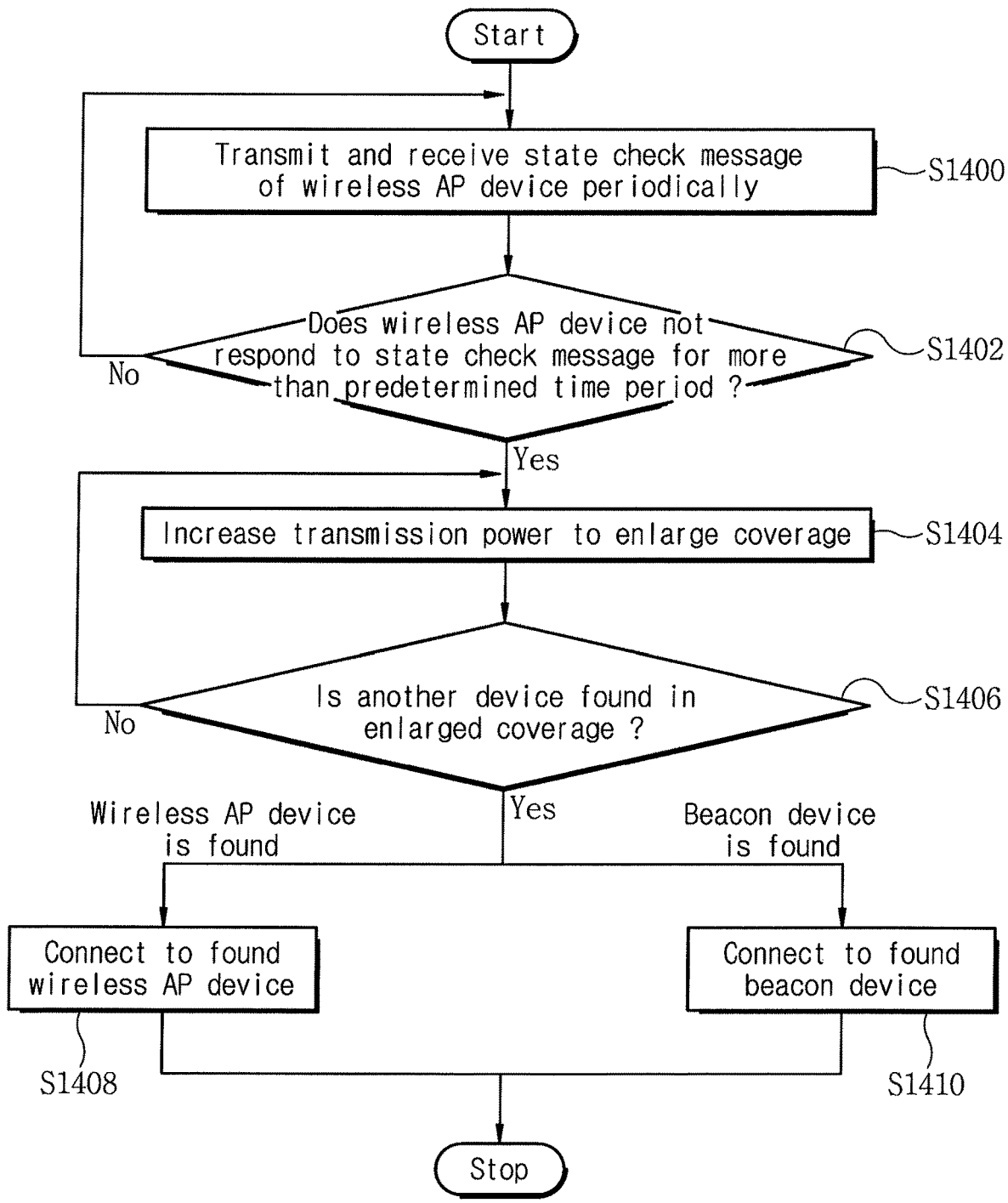
FIG. 14 is a flowchart illustrating an operation of a beacon device for use in performing the wireless mesh network management method according to the fourth embodiment of the present disclosure.

FIG. 14 is a flowchart illustrating an operation of the beacon device for use in performing the wireless mesh network management method according to the fourth embodiment of the present disclosure.

Referring to FIG. 14, the beacon device 900 may periodically transmit a state check message to the wireless AP device 600A (S1400). If the wireless AP device 600 does not respond to the state check message transmitted by the beacon device 900 for more than a predetermined period of time (S1402), the beacon device 900 may determine that an abnormality has occurred in the wireless AP device 600A and increase the transmission power (S1404). As the transmission power increases, the coverage of the beacon device 900 is enlarged so that the beacon device 900 may search another devices in the enlarged coverage (S1406). If no other device is found in the enlarged coverage, the operations of further increasing the transmission power and searching for another device may be repeatedly carried out. However, if another device is found in the enlarged coverage, the beacon device 900 may be connected to the newly found device.

If another wireless AP device is found in the operation S1406, the beacon device 900 connected to the abnormal wireless AP device 600 may be disconnected from the abnormal wireless AP device 600 and establish a new connection to the newly found wireless AP device (S1408). If, however, another beacon device is found in the operation S1406, the beacon device 900 connected to the abnormal wireless AP device 600 may be disconnected from the abnormal wireless AP device 600 and establish a new connection to the newly found beacon device (S1410).

According to the connection state of the beacon device 900, the connections of lower layer beacon devices may be changed depending on the connection state of the beacon device 900. For example, in the case that it is difficult to maintain connections of the lower layer beacon devices while the connection of the beacon device 900 is changed, only the lower layer beacon devices may be connected to another beacon device. In case that a plurality of other beacon devices are found during the searching operation, each of the lower layer beacon devices may be connected the respective beacon devices which are different from each other.

The wireless mesh network management method according to the fourth embodiment of the present disclosure has been described above.

The program recorded on the recording medium may be read and installed in the computer and executed to perform the above-described functions.

In order to allow a computer to read a program recorded on a recording medium and to execute functions implemented by the program, the above-mentioned program may include codes that is written in computer languages such as C, C++, JAVA, and a machine language and can be read out by a processor through device interfaces of the computer.

Such codes may include a function code related to a function or the like that defines the above-described functions, and may include an execution procedure related control code necessary for a processor of the computer to execute the above-described functions according to a predetermined procedure. The codes may further include memory reference related codes as from which location (e.g. address) additional information or media required for the processor of the computer to execute the above described functions should be referenced in the internal or external memory of the computer.

In addition, when the processor of the computer needs to communicate with any other computer or server that is located in a remote site to execute the above-described functions, the codes may further include a communication-related code that represent how to communicate with another computer or the server, and what information or media should be transmitted or received during communication.

The computer-readable media suitable for storing the computer program instructions and data may include, for example, magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as the ROM, the RAM, the flash memory, erasable and programmable ROM (EPROM), and electrically erasable and programmable ROM (EEPROM). The processor and memory may be supplemented by or integrated with special purpose logic circuits.

The computer readable recording medium may be distributed to a plurality of computer systems that may be connected by a network so that computer readable code may be stored and executed in a distributed manner. The functional program for implementing the present disclosure in the distributed manner, and the related code and code segment may be contemplated and changed easily by programmers of the technical field of the present disclosure in consideration of this description and the system environment of the computer system with regard to reading and executing the program.

Each step in the embodiments of the present disclosure may be implemented by computer-executable instructions to be executed by the computing system. As used herein, the term "computing system" or "computer system" is defined as one or more software modules operating on electronic data, one or more hardware modules, or a combination thereof. For example, the definition of the computing system includes software modules such as a personal computer's operating system and hardware components of a personal computer. The physical layout of the module is insignificant.

The computer system may include one or more computers connected through a network.

Similarly, the computing system may be implemented in a single physical device in which an internal module such as a memory and a processor operates in conjunction with performing an operation on the electronic data.

That is, the device for performing the wireless mesh network management method according to the present disclosure may be implemented to perform the above-described embodiments based on the computing system described below.

Figure 15:
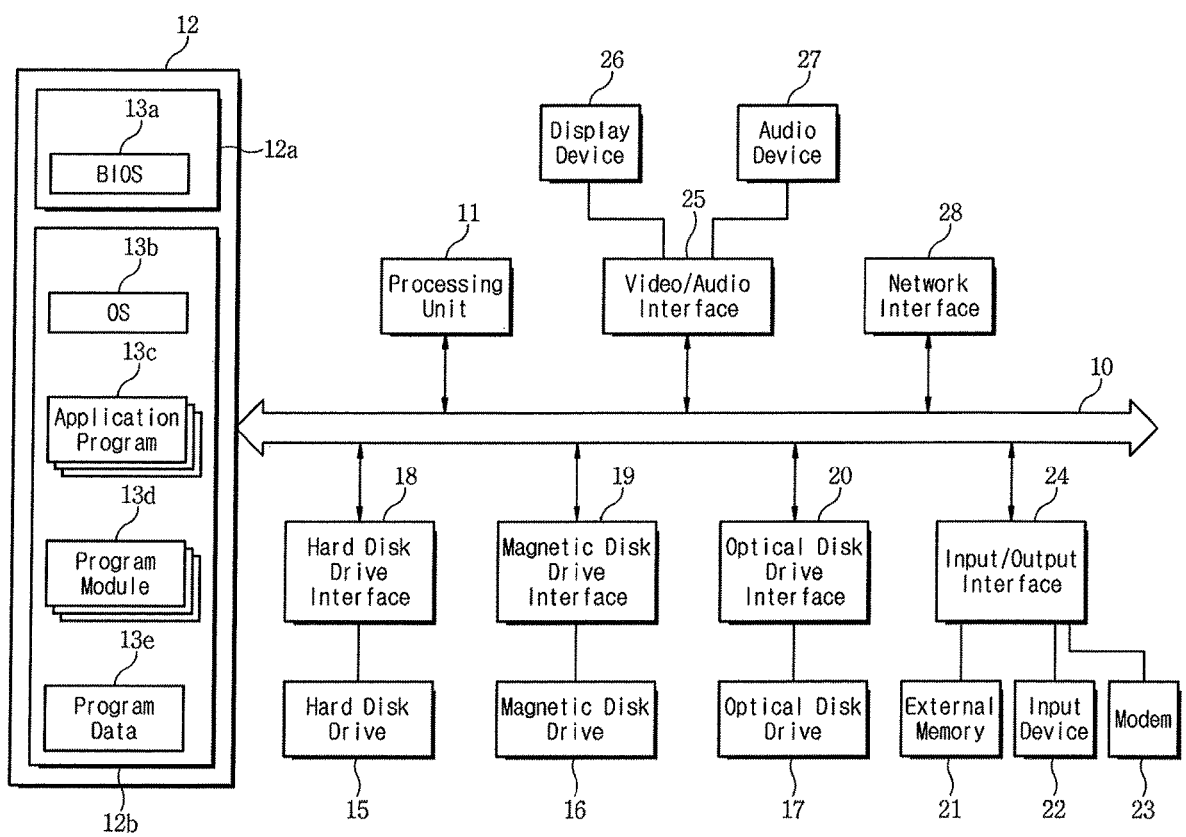
FIG. 15 is a block diagram illustrating an operating environment of a device for performing the wireless mesh network management method according to an embodiment of the present disclosure.

FIG. 15 is a block diagram illustrating an operating environment of a device for performing the mesh network authentication method according to an embodiment of the present disclosure. That is, FIG. 15 illustrates the operating environment of the service device 400.

FIG. 15 and the following description are intended to provide a brief and general description of a suitable computing environment in which the present disclosure may be implemented. Although it is not required, the present disclosure may be described in connection with computer-executable instructions such as program modules that may be executed by a computer system.

Generally, the program modules include routines, programs, objects, components, data structures, and so on suitable for performing particular tasks or implementing particular abstract data types. The computer-executable instructions, associated data structures, and program modules exemplify the program code means for carrying out processes described herein.

Referring to FIG. 15, an exemplary computing system suitable for implementing the present disclosure may include a processing unit 11, a system memory 12, and a system bus 10 that connects various system components including the system memory 12 to the processing unit 11.

The processing unit 11 is capable of executing computer-executable instructions designed to implement the features of the present disclosure.

The system bus 10 may be any of several types of bus architectures including a local bus, an external bus, and a memory bus. Alternatively, the system bus 10 may be any of the bus architectures employing a memory controller. The system memory 12 includes a read-only memory (ROM) 12A and a random access memory 12B. A Basic Input/Output System (BIOS) 13A which includes basic routines that help information transfer between components within the computing system when the system is booted may generally be stored in the ROM 12A.

The computing system may include storage devices. For example, the computing system may include a hard disk drive 15 that reads information from or writes information to a hard disk, a magnetic disk drive 16 that reads information from or writes information to a magnetic disk, and an optical disk drive 17 that reads information from or writes information to an optical disk such as a CD-ROM and other optical medium. The hard disk drive 15, the magnetic disk drive 16, and the optical disk drive 17 may be connected to the system bus 10 by a hard disk drive interface 18, a magnetic disk drive interface 19, and an optical drive interface 20, respectively.

Also, the computing system may further include an external memory 21 as one kind of the storage device. The external memory 21 may be connected to the system bus 10 through an input/output (I/O) interface 24.

The above-described drives and the computer-readable media that may be accessed by the drives allows nonvolatile storage of computer-executable instructions, data structures, program modules, and other data. The exemplary environment described herein illustrates the hard disk 15, the magnetic disk 16, and the optical disk 17, but other types of computer-readable media for storing data such as a magnetic cassette, a flash memory card, a DVD, a Bernoulli cartridge, a RAM, and a ROM may be used as well.

The program code means including one or more program modules that may be loaded and executed by the processing unit 11 and includes an operating system 13B, one or more application programs 13C, other program modules 13D, and program data 13E may be stored in the hard disk 15, the magnetic disk 16, the optical disk 17, the ROM 12A or the RAM 12B.

Also, the computing system may receive commands and information from a user through input devices 22 such as a keyboard, a pointing device, a microphone, a joystick, a game pad, and a scanner. These input devices 22 may be connected to the processing unit 11 via the I/O interface 24 connected to the system bus 10. The I/O interface 24 may logically represent at least one or a combinations of various interfaces such as, for example, a serial port interface, a PS/2 interface, a parallel port interface, a USB interface, an Institute of Electrical and Electronics Engineers (IEEE) 1394 interface (i.e., FireWire interface), and other interfaces.

In addition, the computing system may further include a display device 26 such as a monitor and a liquid crystal display (LCD), and an audio device 27 such as a speaker and a microphone. The display device 26 and the audio device 27 may be connected to the system bus 10 through a video/audio interface 25. Other peripheral devices (not shown) such as a speaker and a printer, for example, may be connected to the computing system. The video/audio interface 25 may include a High Definition Multimedia Interface (HDMI) and Graphics Device Interface (GDI).

The computing system may be connected to a network such as, for example, an office wide area network (WAN) or an enterprise WAN, a home network, Intranet, and/or Internet. The computing system may exchange data with external sources such as, for example, a remote computer system, a remote application, and/or a remote database.

To this end, the computing system may include a network interface 28 for receiving data from an external source and/or transmitting data to the external source.

The computing system may transmit and receive information to and from a remote device through the network interface 28. For example, in case that the computing system refers to the first beacon device 200, the computing system may communicate with the service device 400 through the network interface 28. On the other hand, in case that the computing system refers to the service device 400, the computing system may exchanged information with the first beacon device 200 through the network interface 28. The network interface 28 may represent a network interface card, or an equivalent software such as a network driver interface specification (NDIS) stack, an equivalent hardware, and/or a logical combination of the software and hardware.

Likewise, the computing system may transmit and receive data to and from an external source through the I/O interface 24. The I/O interface 24 may be connected to a modem 23 such as a standard modem, a cable modem, and a digital subscriber line (DSL) modem. The computing system may transmit and receive data to and from the external source through the modem 23.

Although FIG. 15 shows an operating environment suitable for the present disclosure, the principles of the present disclosure may be applicable to any other system capable of implementing the principles of the present disclosure with an appropriate modifications, if necessary. The environment shown in FIG. 21 is illustrative only and does not represent even a small portion of various environments in which the principles of the present disclosure may be implemented.

In addition, various information generated during the execution of a wireless network setting program may be stored and accessed in a computer-readable medium related with the computing system. For example, a portion of these program modules and a portion of the associated program data may be included in the operating system 13B, the application program 13C, the program module 13D, and/or the program data 13E to be stored in the system memory 12.

Further, when a mass storage device such as the hard disk is connected to the computing system, such program module and related program data may be stored in the mass storage device. In a networked environment, the program modules associated with the present disclosure, or portions thereof, may be stored in a remote computer system (e.g. a system memory related with a computing system of the first beacon device 100 and the service device 400, or a remote memory device such as a mass storage device) connected via the I/O interface 24 and the modem 23 or the network interface 25. The execution of such a module may be performed in a distributed environment as described above.

While the present specification contains a number of specific implementation details, it should be understood that they are not to be construed as limitations on the scope of any disclosure or claims, but as a description of features that may be specific to a particular embodiment of a particular disclosure. Certain features described with respect to contexts of independent embodiments may be implemented in combination in a single embodiment.

Conversely, various features described in the context of a single embodiment may also be implemented in other embodiments either individually or in any suitable sub-combination. Further, although some features may be described to operate in a particular combination and may be initially depicted as so claimed, one or more features from the claimed combination may in some cases be excluded from the combination, and a claimed combination may be replaced by a sub-combination or a variant of the sub-combination.

Similarly, although the operations are depicted in the drawings in a particular order, it should not be understood that such operations need to be performed in that particular order or sequential order shown to achieve the desired result or all the depicted operations should be performed. In certain cases, multitasking and parallel processing may be advantageous. Also, The fragmentation of the various system components in the above-described embodiments should not be understood as requiring such fragmentation in all embodiments, and the program components and systems described above may generally be integrated together into a single software product or packaged into a multiple-function software product.

The descriptions set forth above disclose the best mode of the present disclosure, and is provided to illustrate the disclosure and to enable those skilled in the art to make and use the disclosure. The written description is not intended to limit the disclosure to the specific terminology presented. Thus, although the present disclosure has been described in detail with reference to the above examples, those skilled in the art will be able to make adaptations, modifications, and variations on the examples without departing from the scope of the present disclosure.

Accordingly, the scope of the present disclosure should not be limited by the illustrated embodiments but should be defined by the appended claims.

The present disclosure relates to a wireless mesh network management method and a device for implementing the method. According to the present disclosure, it is possible to monitor service traffic generated by a request of a mobile terminal device having recognized a beacon device in its vicinity, and detect an abnormal beacon device that does not operate normally according to a change in the service traffic.

Accordingly, when there is a beacon device in an abnormal state, the connection state of the mesh network may be changed to reduce problems caused by a failure or hacking of the beacon device and to facilitate management of the mesh network.

Also, when there is a beacon device in an abnormal state, the abnormal beacon device may be remotely checked through the administrator terminal device. Thus, it is possible to check and solve the problems occurred in the beacon device and maintain the mesh network in good condition.

When there is a beacon device that requires the setting change, a user terminal is searched and the setting change is performed by the user terminal device to facilitate management of the mesh network.

A beacon device having recognized an abnormality of the nearby wireless AP device may increase the transmission power and enlarge the coverage so that another beacon device having connected to the abnormal the wireless AP device establishes a connection to another wireless AP device or the other beacon device. Thus, it is possible to reduce the problems caused by a failure or hacking of the beacon device and facilitate management of the mesh network.

According to the present disclosure, it is possible to implement the wireless mesh network similar to a wired mesh network in the wireless network and overcome the limitation of the wireless LAN. Thus, the service provider who operates the service device can smoothly provide the service. Therefore, the present disclosure may contribute to the development of the service industry. The present disclosure is industrially applicable because it can actually be implemented obviously and has a sufficiently high possibility of commercialization or sales.

What is claimed is:

1. A service device, comprising:
    a communicator configured to exchange data with at least one beacon device, from a plurality of beacon devices and a mobile communication device; and
    a controller configured to:
        monitor, for each beacon device configured to exchange data with the communicator, service traffic generated corresponding to the respective beacon device;
        detect a change in the service traffic; and
        determine whether any beacon device from the plurality of beacon devices is abnormal based on the change in the service traffic,
    wherein, when any beacon device from the plurality of beacon devices is determined to be an abnormal beacon device, the controller is configured to:
        control a selected beacon device from the plurality of beacon devices located within a predetermined range from the abnormal beacon device to increase a transmission power the selected beacon device for a greater coverage;
        disconnect communication with any beacon device from the plurality of beacon devices that are connected to the abnormal beacon device; and
        control the disconnected bacon devices to establish a new connection with any beacon device from the plurality of beacon devices having the greater coverage.

2. The service device of claim 1, wherein the device further comprises:
    a memory configured to store a statistic value of the service traffic in a normal state for each beacon device of the plurality of beacon devices,
    wherein the controller is configured to collect the statistic value of the service traffic in the normal state based on the service traffic generated for each beacon device of the plurality of beacon devices in the normal state to store in the memory.

3. The service device of claim 2, wherein the controller is configured to:
    compare a current service traffic volume with the statistic value of the service traffic in the normal state; and
    determine that a beacon device is abnormal when a difference between the current service traffic volume and the statistic value of the service traffic in the normal state for a corresponding beacon device is greater than a first threshold value.

4. The service device of claim 1, wherein the controller is configured to determine that a beacon device is abnormal when a current service traffic volume for a corresponding beacon device is less than a second threshold value.

5. The service device of claim 1, wherein the memory is configured to store network management information in advance, and
    wherein the controller is configured to select a beacon device requiring the greater coverage based on the network management information.

6. A service device, comprising:
    a communicator configured to:
        exchange data with at least one beacon device from a plurality of beacon devices and a mobile communication device; and
        transmit a control message to the mobile communication device; and a controller configured to:
            monitor, for each beacon device configured to exchange data with the communicator, service traffic generated corresponding to the respective beacon device;
            detect a change in the service traffic; and
            determine whether any beacon device from the plurality of beacon devices is abnormal or requires change of setting based on the change in the service traffic,
    wherein, when any beacon device from the plurality of beacon devices is determined to be an abnormal beacon device, the controller is configured to:
        select an administrator device to check the abnormal beacon device;
        transmit information of the abnormal beacon device to the selected administrator device;
        control the selected administrator device to establish a connection between the abnormal beacon device and the service device through the selected administrator device; and
        perform remote checking for the abnormal beacon device, wherein, when any beacon device from the plurality of beacon devices requires the change of setting, the controller is configured to:
- search for a user device located within a predetermined range from the beacon device that requires the change of setting;
- connect the searched user device to the beacon device that requires the change of setting; and
- control the searched user device to communicate with the beacon device that requires the change of setting and to change a setting of the beacon device that requires the change of setting.

7. The service device of claim 6, wherein the controller is configured to select an administrator device located within a predetermined range from the abnormal beacon device as the selected administrator device.

8. The service device of claim 6, wherein the controller is configured to:
- control the selected administrator device to establish the connection between the abnormal beacon device and the service device through the selected administrator device; and
- perform the remote checking for the abnormal beacon device.

9. The service device of claim 6, wherein the controller is configured to select the selected administrator device based on previously stored administrator information.

10. The service device of claim 6, wherein the device further comprises:
- a memory configured to store a statistic value of the service traffic in a normal state for each beacon device of the plurality of beacon devices, wherein the controller is configured to:
- collect the statistic value of the service traffic in the normal state based on the service traffic generated for each beacon device of the plurality of beacon devices in the normal state to store in the memory;
- compare a current service traffic volume with the statistic value of the service traffic in the normal state; and
- determine that a beacon device requires the change of setting when a difference between the current service traffic volume and the statistic value of the service traffic in the normal state is less than a first threshold value but is greater than a third threshold value.

11. The service device of claim 6, wherein the device further comprises:
- a memory configured to store a target service traffic volume, wherein the controller is configured to:
- compare a current service traffic volume for each beacon device of the plurality of beach devices with the target service traffic volume; and
- determine that a beacon device requires the change of setting when a difference between the current service traffic volume and the target service traffic volume is greater than a fourth threshold value.

* * * * *